(12) United States Patent
Shannon et al.

(10) Patent No.: US 7,106,297 B2
(45) Date of Patent: Sep. 12, 2006

(54) COLOR DISPLAY DEVICE

(75) Inventors: John M. Shannon, Whyteleafe (GB);
Ian D. French, Hove (GB); Jeremy N. Sandoe, Horsham (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 396 days.

(21) Appl. No.: 10/242,970

(22) Filed: Sep. 13, 2002

(65) Prior Publication Data
US 2003/0070929 A1    Apr. 17, 2003

(30) Foreign Application Priority Data
Oct. 10, 2001    (GB) ................. 0124247.8

(51) Int. Cl.
*G09G 3/34*    (2006.01)
(52) U.S. Cl. .................. 345/107; 345/82; 359/296
(58) Field of Classification Search .............. 345/107, 345/82–84; 359/296; 340/373
See application file for complete search history.

(56) References Cited

U.S. PATENT DOCUMENTS

| | | | | |
|---|---|---|---|---|
| 4,402,062 A | * | 8/1983 | Batchelder | 365/153 |
| 4,418,346 A | * | 11/1983 | Batchelder | 345/107 |
| 5,767,826 A | * | 6/1998 | Sheridon et al. | 345/84 |
| 5,917,646 A | * | 6/1999 | Sheridon | 359/296 |
| 5,961,804 A | | 10/1999 | Jacobson et al. | 204/606 |
| 6,120,588 A | | 9/2000 | Jacobson | 106/31.16 |
| 6,172,798 B1 | | 1/2001 | Albert et al. | 359/296 |
| 6,396,621 B1 | * | 5/2002 | Sheridon | 359/296 |
| 6,445,490 B1 | * | 9/2002 | Chopra et al. | 359/296 |
| 6,753,999 B1 | * | 6/2004 | Zehner et al. | 359/296 |

OTHER PUBLICATIONS

Thomas B. Jones, "Electromechanics of Particles", Cambridge University Press, 1995, pp. 238-247.

* cited by examiner

*Primary Examiner*—Richard Hjerpe
*Assistant Examiner*—Kimnhung Nguyen

(57) ABSTRACT

A color display device based on dielectrophoresis is described. The device includes a dielectrophoretic mixture comprising semi-insulating particles of each of the subtractive primary colors cyan (32), magenta (34) and yellow (36) in a semi-insulating liquid (24). The dielectrophoretic frequency characteristics of the particles are the same or similar for particles of the same color but different between the three colors. In particular, the transition frequency ($f_0$) is different for each color, or two colors may have the same transition frequency ($f_0$) if one has a reversed sense dielectrophoretic frequency characteristic. Also the speeds of the particles are the same for particles of the same color but different between the three colors. The pixels are driven with alternating voltages of different frequencies ($f_1$, $f_2$, $f_3$, $f_4$) and duration determined such that different proportions of the different colors of particles are moved, dependent upon their transition frequencies and speeds. A reflective, saturated full color display device may thereby be provided.

29 Claims, 18 Drawing Sheets

COLOR DISPLAY DEVICE

This invention relates to dielectrophoretic colour display devices, and to dielectrophoretic mixtures for use in such display devices.

Many types of display devices employing different types of light modulation material or mechanism are known. Some examples are cathode ray tubes, and liquid crystal, electroluminescent, micromechanical, and electrophoretic display devices.

In such displays a display area is conventionally divided into pixels. Colour pixels, and hence colour displays, are usually provided by dividing each pixel into three sub-pixels, with each sub-pixel displaying one of the three additive primary colours of blue, green and red. To display one of these colours, e.g. blue, the blue sub-pixel is set to an on-mode and the other two sub-pixels to an off-mode, such that only blue light is displayed. For colours other than blue, green or red, light from the different sub-pixels is added in varying densities as required. Such displays are able to provide all colours, often with excellent colour tones.

However, because such displays use additive primary colours, inherently a large proportion of potential output light is wasted, e.g. when the colour blue is being displayed, all the blue wavelengths in the light falling on the green and red sub-pixels is wasted. In the case of reflective display devices, this fundamentally means the reflected light will always be significantly dimmer than the ambient light.

In contrast, techniques that provide saturated colour do not inherently waste such large proportions of potential output light. Such techniques are used for example in most colour printing on paper. Here the three subtractive primary colours of cyan, magenta and yellow are used. To print a dot (which we can consider to be analogous to a pixel in a display) of one of these colours, e.g. cyan, just that colour is printed to form the dot. For colours other than cyan, magenta or yellow, ink of the different subtractive primary colours is added in varying densities as required on top of each other or otherwise mixed over the same area to provide a dot. Light passes through all the coloured inks of the dot, is reflected by the paper, and then passes through the dot again. The resulting output light comprises white light minus those wavelengths subtracted by the subtractive primary colours in the ink dot. Because cyan subtracts red, magenta subtracts green, and yellow subtracts blue, the primary subtractive colours can, in varying densities, provide all colours. If all three are used to a sufficient density to subtract respectively all red, green and yellow light, then black is provided.

Such an arrangement provides a saturated colour image, because light of a given wavelength, e.g. blue, does not have to be wasted falling on red and green sub-pixels.

Limited use of the subtractive primary colours in a display device has been disclosed by U.S. Pat. No. 6,120,588 for a further type of display device, which uses a dielectrophoretic mixture as the light modulation material (and is hereinafter referred to as a dielectrophoretic display device). Before discussing this disclosure further, a brief explanation of dielectrophoresis will now be given.

It is known that semi-insulating particles move along a field gradient in a semi-insulating liquid. The particles move either towards the high field regions or low field regions of an applied electric field depending on the frequency (i.e. which side of a transition frequency $f_0$) of the applied field. The phenomenon is called dielectrophoresis. The transition frequency $f_0$ is a complicated function of the conductivities and permittivities of the particles and the liquid, and is often close to the relaxation time of the interface between a particle and the liquid. A typical dielectrophoretic frequency characteristic is shown in FIG. 1.

Returning to U.S. Pat. No. 6,120,588, this discloses a display medium comprising microcapsules containing particles of two of the subtractive primary colours and something described as an "internal phase" of the remaining third subtractive primary colour. U.S. Pat. No. 6,120,588 asserts that particles of a given colour may be moved without moving the particles of the other colours, by application of a respective given frequency of applied electric field, and discloses use of this to display (only) three distinct colours separately, i.e. a first colour of "cyan and yellow", a second colour of "cyan and magenta", and a third colour of "magenta and yellow".

Thus U.S. Pat. No. 6,120,588 fails to disclose a full colour saturated display in which all combinations of the subtractive primary colours, including individual cyan, magenta or yellow, and different densities thereof, may be displayed. Moreover, given known dielectrophoretic behaviour, it is not clear how the relied-upon single colour particle movement occurs separately for each applied frequency without some of the frequencies moving particles of more than one colour.

U.S. Pat. No. 6,172,798 discloses one of the other types of display devices described earlier, namely an electrophoretic display, using the additive primary colours of red, green and blue. As with dielectrophoretic displays, electrophoretic displays also use coloured particles moving in a liquid, however they use D.C. fields. There is therefore a D.C. polarity dependence of the direction of movement of the particles in the liquid, i.e. the direction of movement is not frequency-dependent. U.S. Pat. No. 6,172,798 discloses using differently coloured particles (red, green, blue) with different electrophoretic mobilities arising from different zeta potentials. The differently coloured particles are attracted to either side of a capsule, by using electric field polarity reversals timed to allow the difference in mobilities to separate differently coloured particles. This procedure relies fundamentally on (a) the colours being additive primary colours, i.e. read-out light only strikes those colour particles brought to the top side of the capsule by the movement, and thus the particles of other colours may remain under the top side of the capsule, and (b) the D.C. polarity dependence of the direction of movement of particles in an electrophoretic mixture. Thus, for at least each of reasons (a) and (b), the approach disclosed by U.S. Pat. No. 6,172,798 is not applicable to dielectrophoretic displays or to a saturated full colour display using the subtractive primary colours.

It would thus be desirable to provide a saturated full colour display, i.e. a display using the subtractive primary colours, in which each combination of the colours may be provided at any one pixel.

In a first aspect, the present invention provides a dielectrophoretic mixture for a display, comprising semi-insulating particles of each of the colours cyan, magenta and yellow in a semi-insulating liquid, the transition frequencies of each of the colours being separated from those of the other two, and the speed of movement of the particles of a given colour being substantially the same, but the speed of movement of particles of each respective colour being significantly different from the other two colours. The respective transition frequencies of the plural particles of a given colour are substantially the same as each other, or at least similar to each other in comparison to the separation of the transition frequency from those of the particles of the other colours.

Preferably both the different transition frequencies and speeds of movement are provided by using particles of substantially the same size for each colour but different sizes for the respective colours.

In a further aspect, the dielectrophoretic mixture is contained in polymer capsules.

In a further aspect, particles of one or more of the colours may have a reverse force dielectrophoretic frequency characteristic, in which case the transition frequency for that colour may be approximately the same as one of the other colours.

In further aspects, only two of the colours cyan, magenta and yellow are included.

In a further aspect, the present invention provides a dielectrophoretic display device comprising a dielectrophoretic mixture according to any of the above described aspects, the device being arranged such that the dielectrophoretic mixture is divided into pixels, with each pixel having a main light modulating area such that the dielectrophoretic mixture provides selective colour modulation of light passing through the main light modulation area mixture according to which colour particles are present in the main light modulation area, the device further comprising electrodes arranged to provide high and low electric field regions.

Preferably one or more high electric field regions or one or more low electric field regions correspond to the main light modulation area such that particles may be moved in or out of the main light modulation area by being moved toward either the high or low field regions.

Preferably the device comprises a driving arrangement for driving the electrodes with alternating voltages providing different frequencies and duration ("pulse length"), with the different frequencies and durations being determined such that different proportions of the different colours of particles are moved, dependent upon their transition frequencies and speeds. Depending on which colour or colours of particles are to be moved, single combinations of frequency and duration may be employed or plural combinations of frequency and duration may be employed in sequence.

Preferably the device is a reflective display device comprising a reflective layer for reflecting input light back through the dielectrophoretic mixture.

In a further aspect, the present invention provides a method of driving a dielectrophoretic display device, comprising using drive frequency selection to control which colour particles are moved in or out of a pixel or main light modulating area of a pixel, and using voltage pulse length ("duration") to control the proportion or number of particles that move.

Preferably the pixels are refreshed each frame by being reset to black by moving all the colours into the main light modulation area or by being reset to white by moving all the colours out of the main light modulation area.

Further aspects of the invention are as claimed in the appended claims.

Embodiments of the present invention will now be described, by way of example, with reference to the accompanying drawings, in which.

Figure 6:
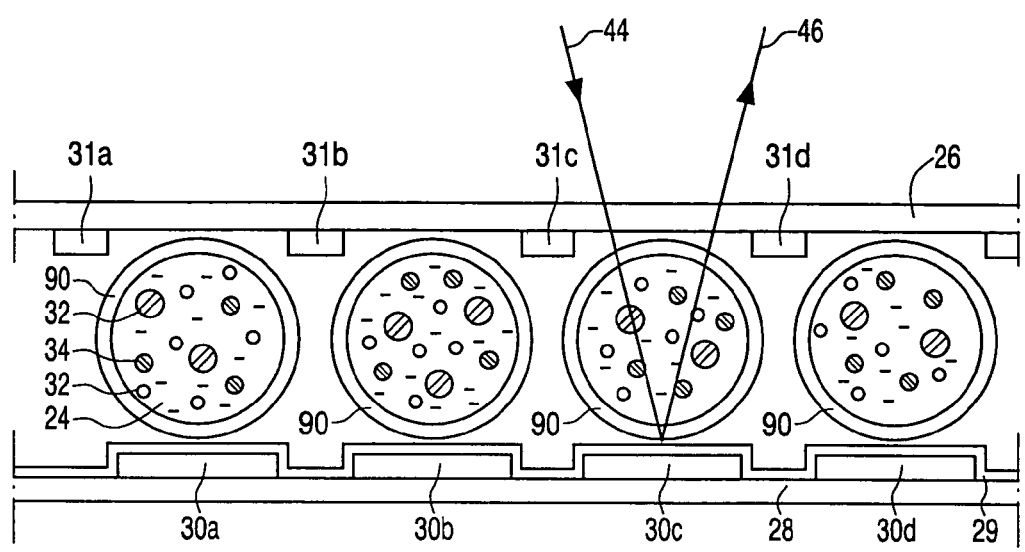
FIG. 6 shows four pixels of a further dielectrophoretic display device in which a dielectrophoretic mixture is encapsulated in transparent polymer capsules.
Figure 7:
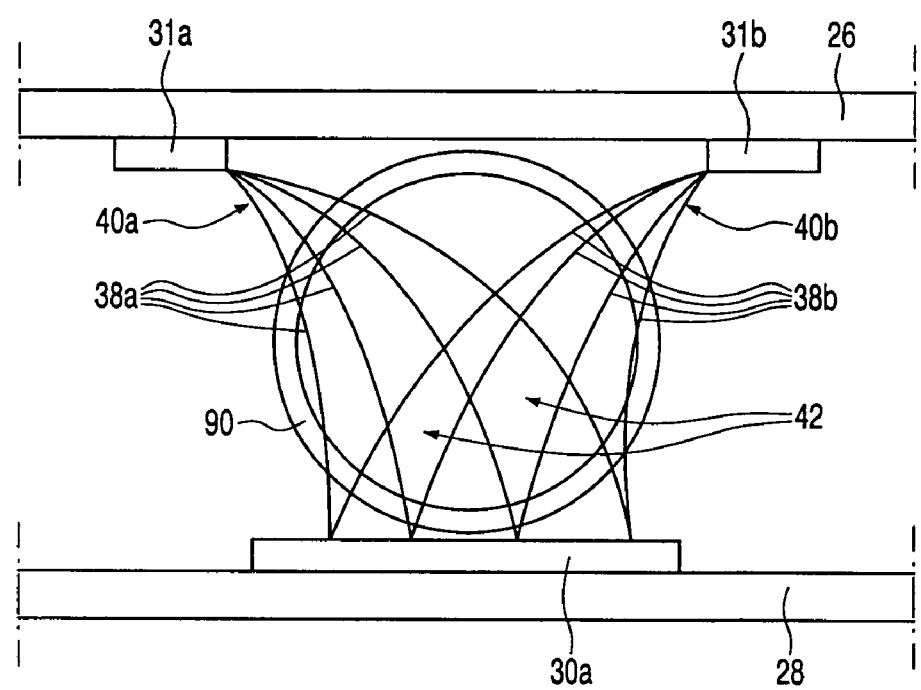
Figure 8:
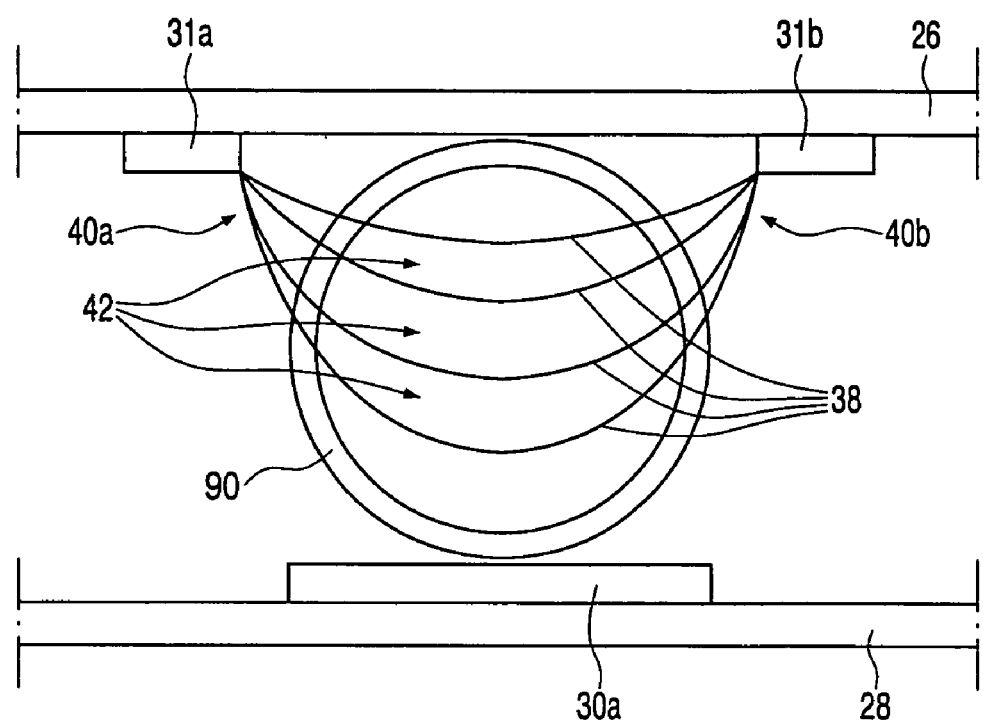
Figure 9:
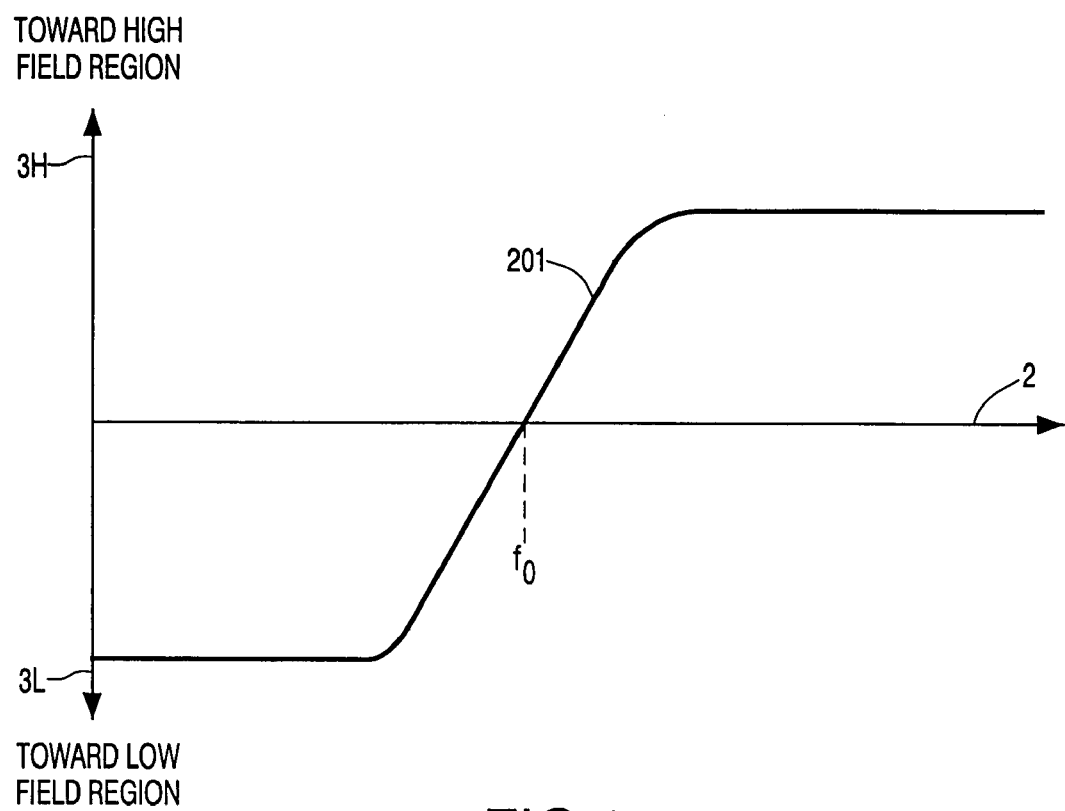
Figure 10:
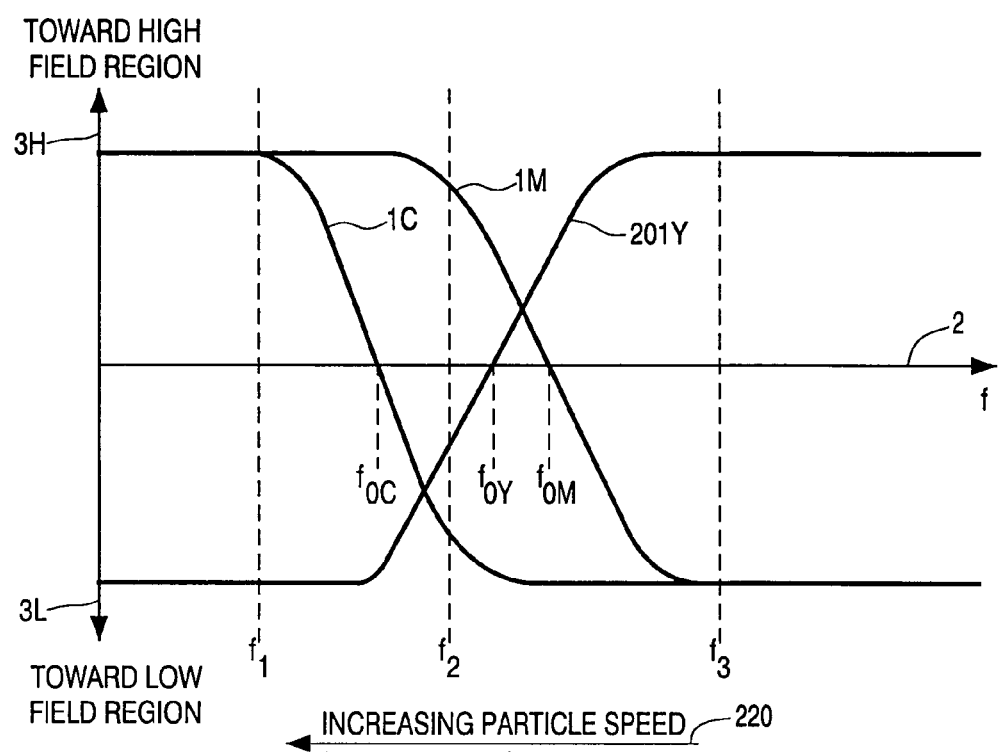
Figure 11:
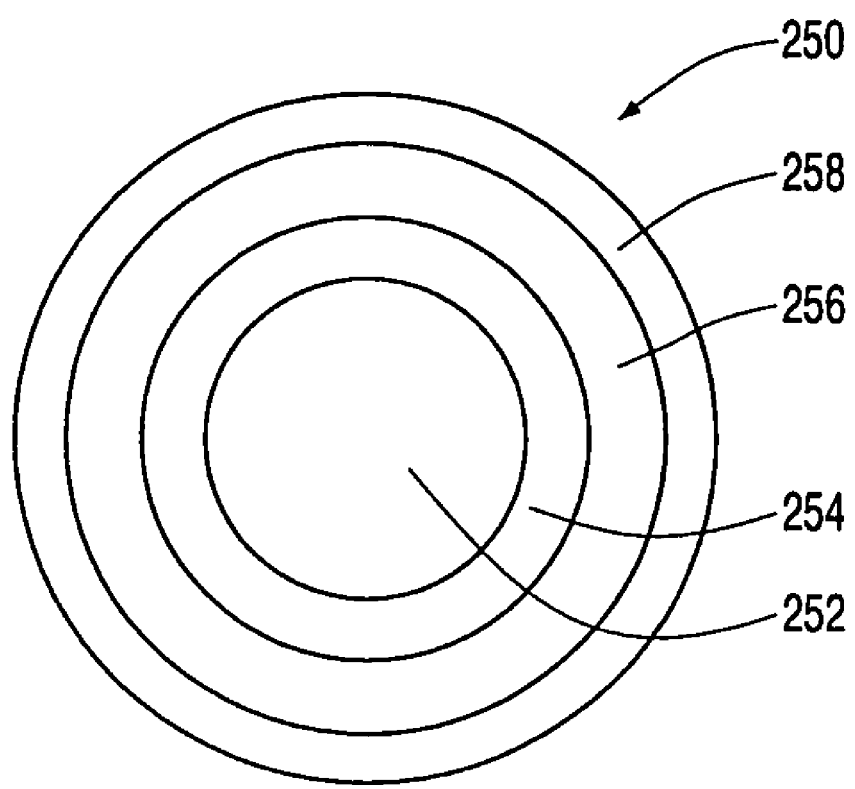
Figure 12:
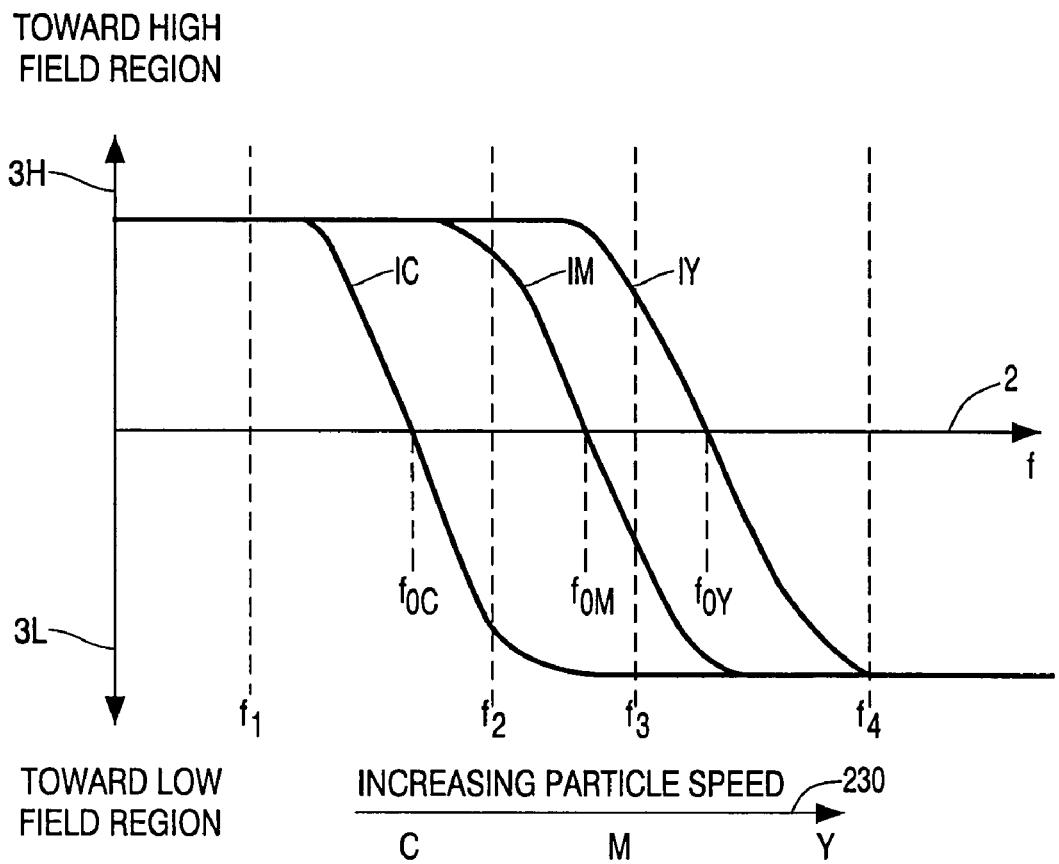
Figure 13:
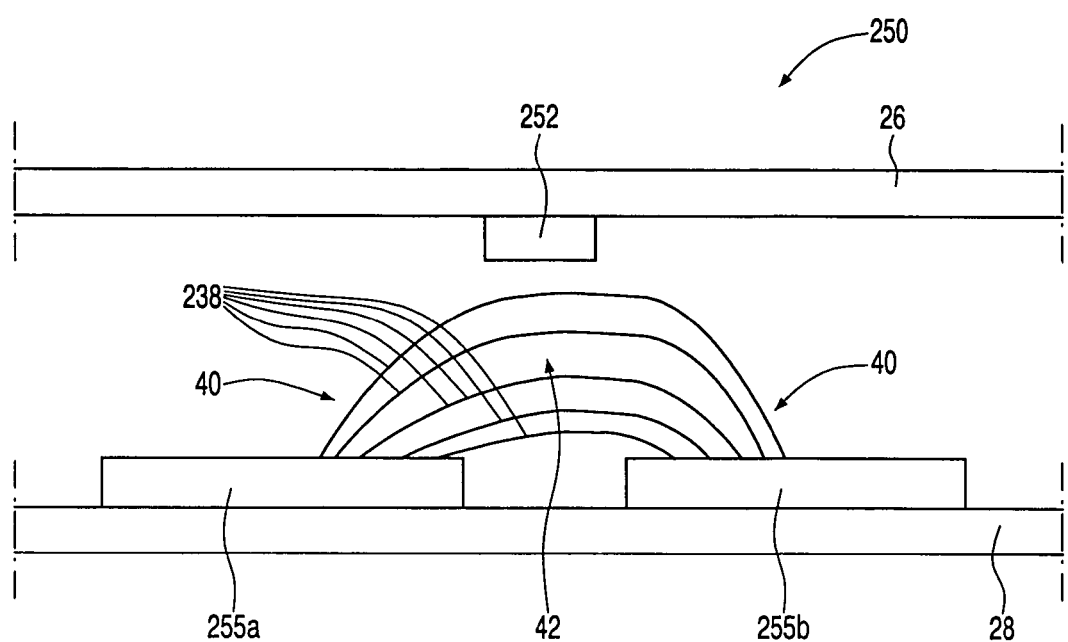
Figure 14:
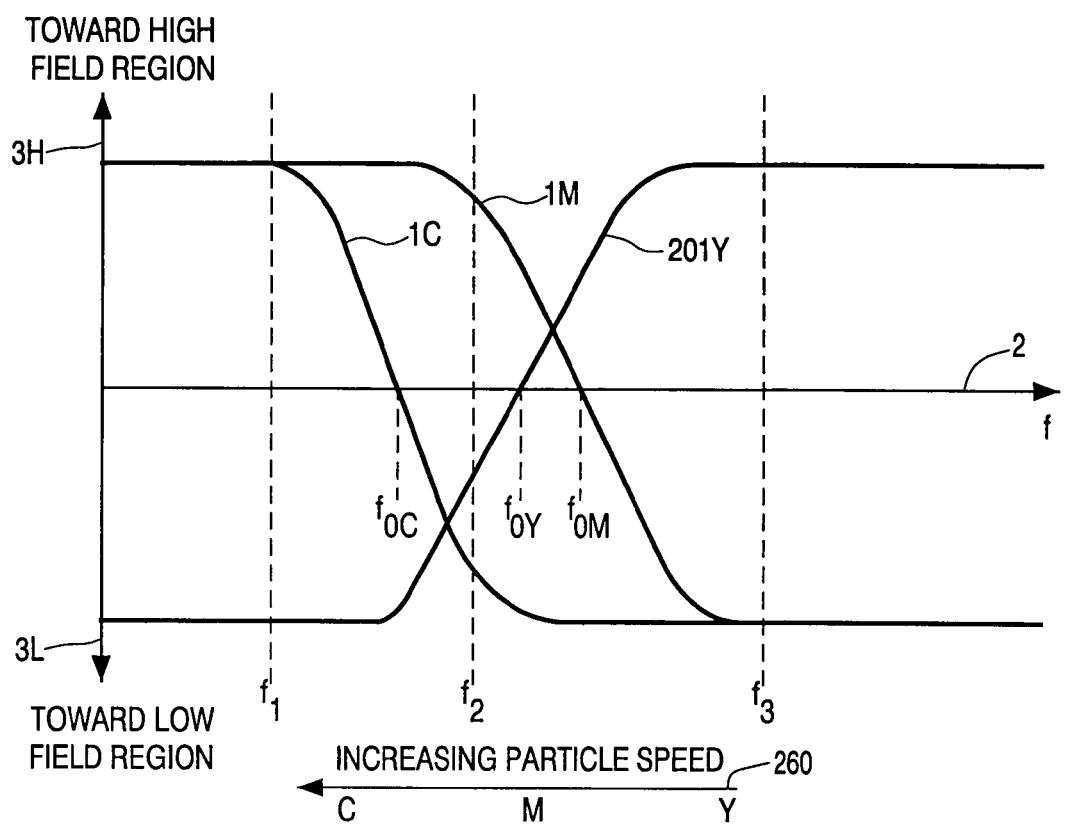
Figure 15:
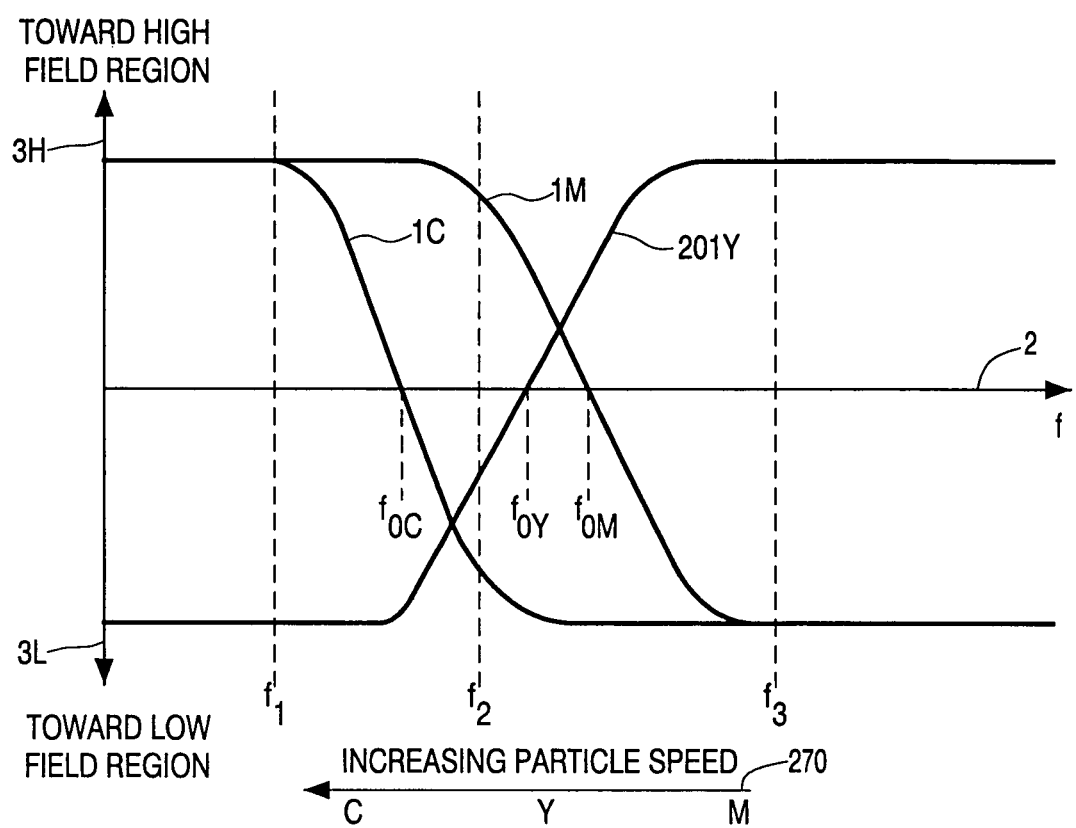
Figure 16:
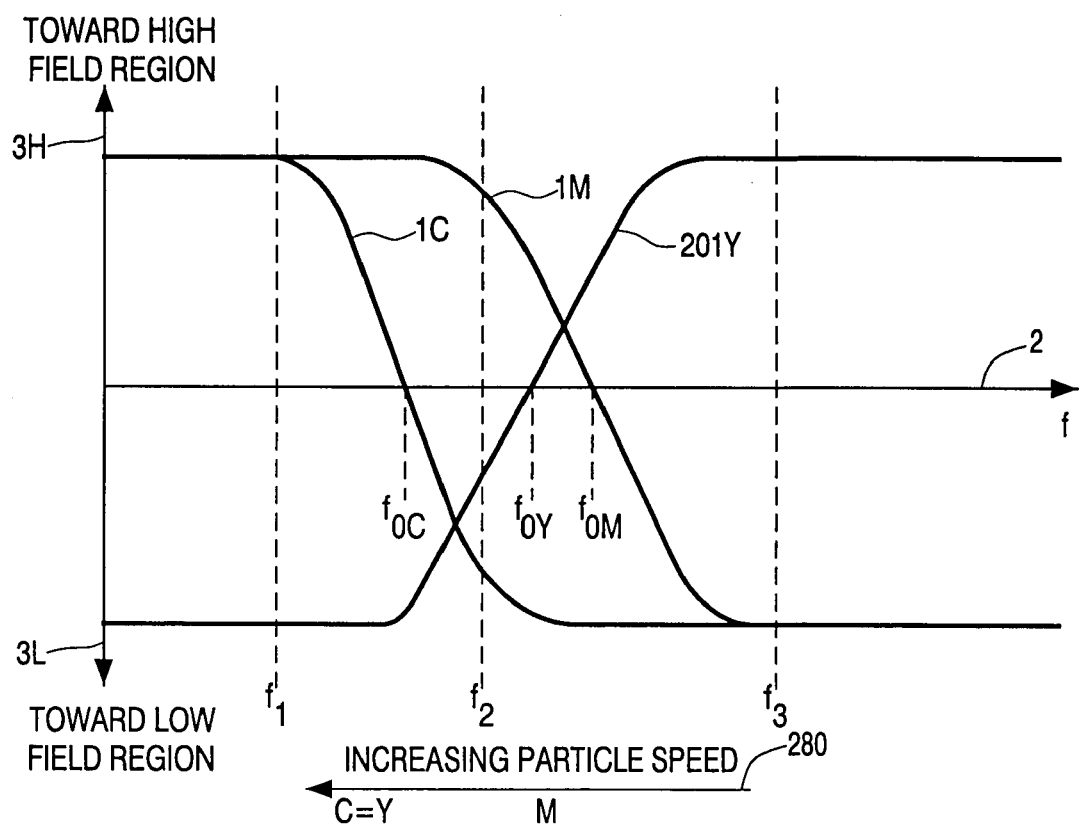
Figure 17:
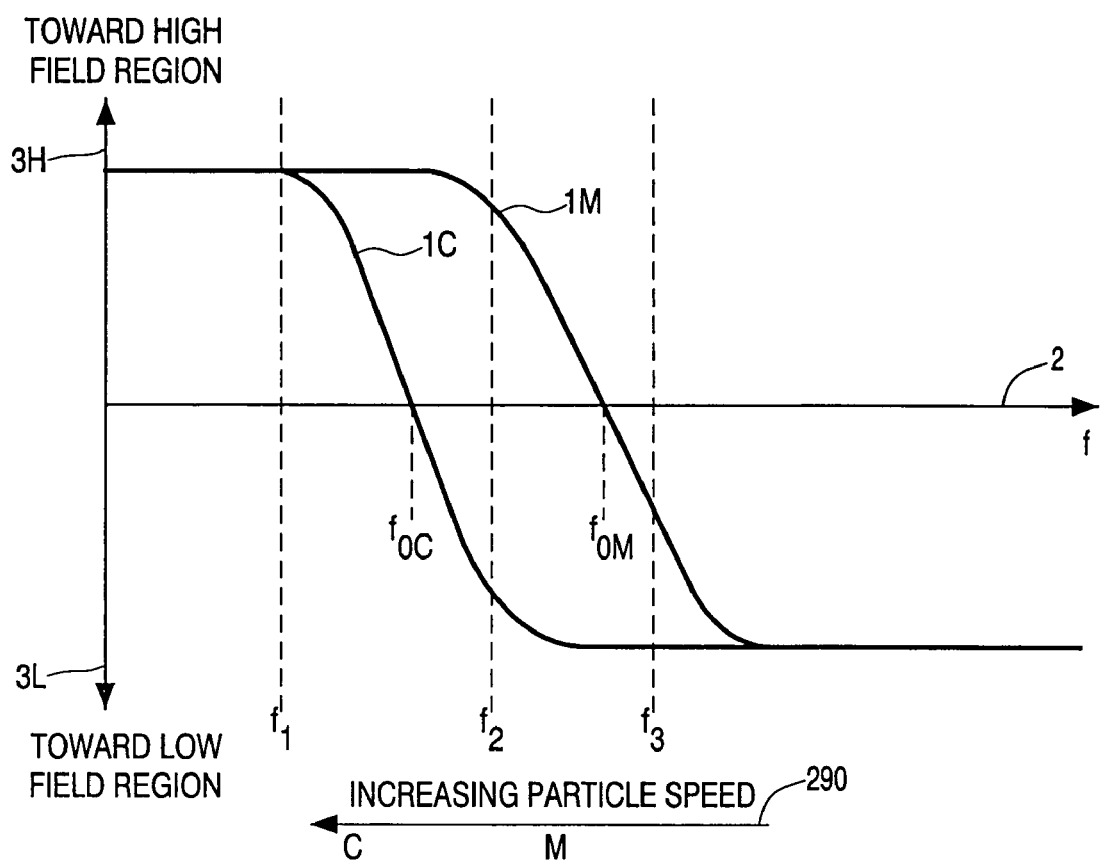
Figure 18:
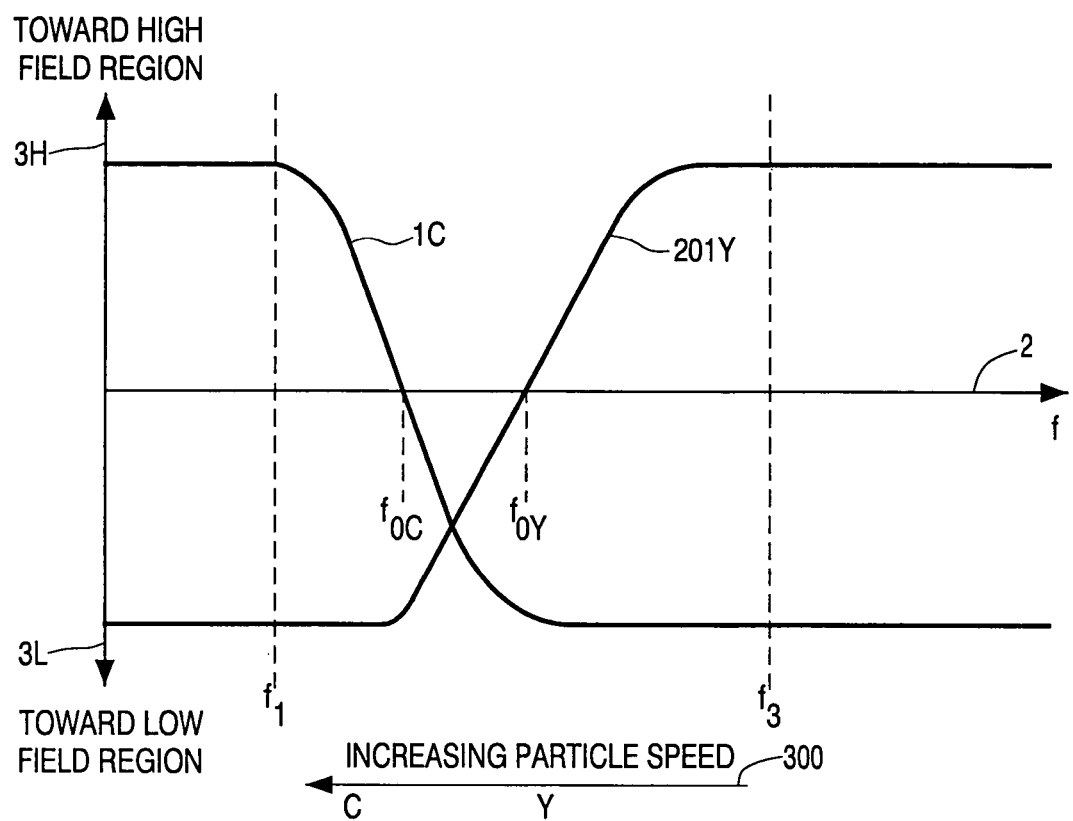

FIG. 7 schematically illustrates one way that high and low field regions may be provided in the pixels/capsules of FIG. 6;

FIG. 8 schematically illustrates another way that high and low field regions may be provided in the pixels/capsules of FIG. 6;

FIG. 9 shows a reversed sense dielectrophoretic frequency characteristic;

FIG. 10 shows the dielectrophoretic frequency characteristic of each different colour of particle and an indication of different speeds of the different colours of particles in another dielectrophoretic mixture where one of the colours has a reversed sense dielectrophoretic frequency characteristic;

FIG. 11 shows a shell structure semi-insulating particle with a reversed sense dielectrophoretic frequency characteristic;

FIG. 12 shows the dielectrophoretic frequency characteristic of each different colour of particle and an indication of different speeds of the different colours of particles in another dielectrophoretic mixture;

FIG. 13 shows an electrode arrangement that may be used to provide another arrangement of low and high field regions;

FIG. 14 shows the dielectrophoretic frequency characteristic of each different colour of particle and an indication of different speeds of the different colours of particles in another dielectrophoretic mixture where one of the colours has a reversed sense dielectrophoretic frequency characteristic;

FIG. 15 shows the dielectrophoretic frequency characteristic of each different colour of particle and an indication of different speeds of the different colours of particles in another dielectrophoretic mixture where one of the colours has a reversed sense dielectrophoretic frequency characteristic;

FIG. 16 shows the dielectrophoretic frequency characteristic of each different colour of particle and an indication of different speeds of the different colours of particles in another dielectrophoretic mixture where one of the colours has a reversed sense dielectrophoretic frequency characteristic;

FIG. 17 shows the dielectrophoretic frequency characteristic of each different colour of particle and an indication of different speeds of the different colours of particles in another dielectrophoretic mixture; and FIG. 18 shows the dielectrophoretic frequency characteristic of each different colour of particle and an indication of different speeds of the different colours of particles in another dielectrophoretic mixture where one of the colours has a reversed sense dielectrophoretic frequency characteristic.

As mentioned in the introduction, under the phenomenon called dielectrophoresis, semi-insulating particles move along a field gradient in a semi-insulating liquid. The particles move either towards the relatively higher field regions or towards the relatively lower field regions of an applied electric field depending on the frequency (i.e. which side of a transition frequency $f_0$) of the applied field.

Figure 1:
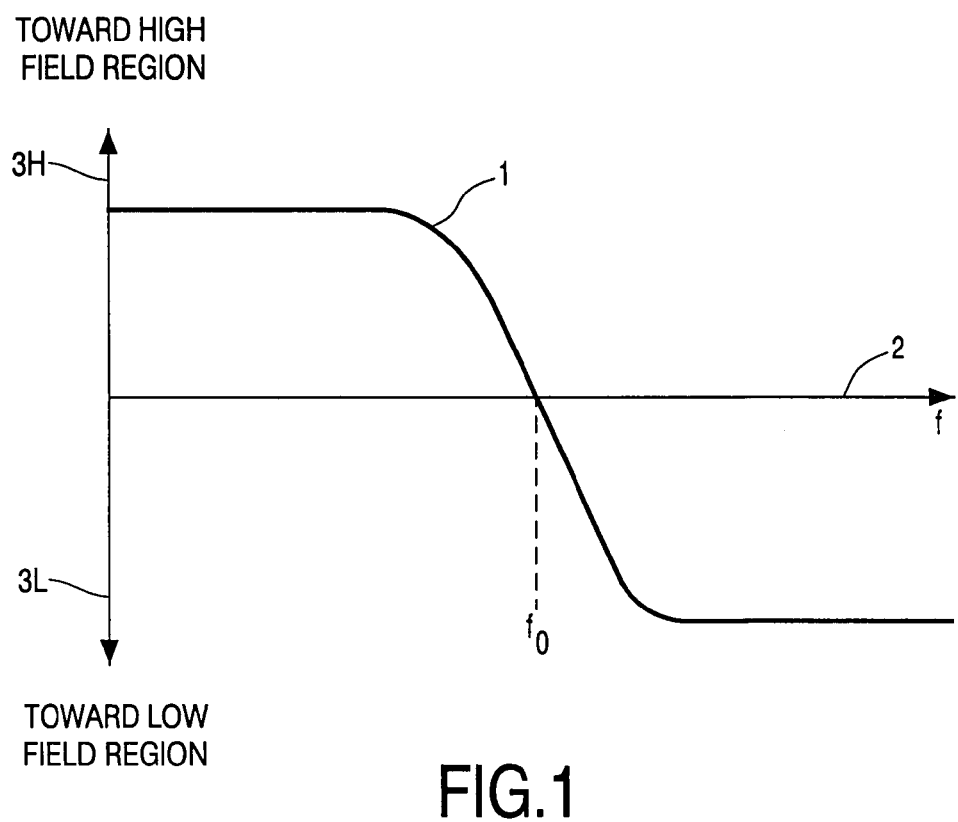
FIG. 1 shows a dielectrophoretic frequency characteristic.

In the first embodiment transparent coloured particles, in a transparent liquid, each with a dielectrophoretic frequency characteristic approximately of the form shown in FIG. 1, are employed. FIG. 1 shows a plot 1 showing the force on a particle due to the dielectrophoretic effect as a function of the applied frequency (f), represented by frequency axis 2. In FIG. 1, the frequency axis 2 also serves to indicate whether the force on the particle is towards the relatively higher field region, indicated by the "positive" part 3H of the force axis i.e. where the plot 1 lies above the frequency axis 2, or whether the force on the particle is towards the relatively lower field region, indicated by the "negative" part 3L of the force axis i.e. where the plot 1 lies below the frequency axis 2. Also indicated is the transition frequency $f_0$, i.e. the frequency at which the force on the particle changes between being directed to the higher field region and being directed to the lower field region.

In this embodiment, a dielectrophoretic mixture comprising a transparent liquid containing plural transparent particles of each of the three subtractive primary colours, i.e. cyan, magenta and yellow, is employed. The transparent liquid is water with potassium chloride dissolved therein to set its conductivity. However, it will be appreciated that any suitable semi-insulating transparent liquid may be used, another possibility for example being isopar, which is an organic transparent liquid.

It will be understood that a transparent cyan particle is one that substantially absorbs red light but substantially allows blue and green (which together provide cyan) light to pass through it, a transparent magenta particle is one that substantially absorbs green light but substantially allows blue and red (which together provide magenta) light to pass through it, and a transparent yellow particle is one that substantially absorbs blue light but substantially allows green and red (which together provide yellow) light to pass through it.

Figure 2:
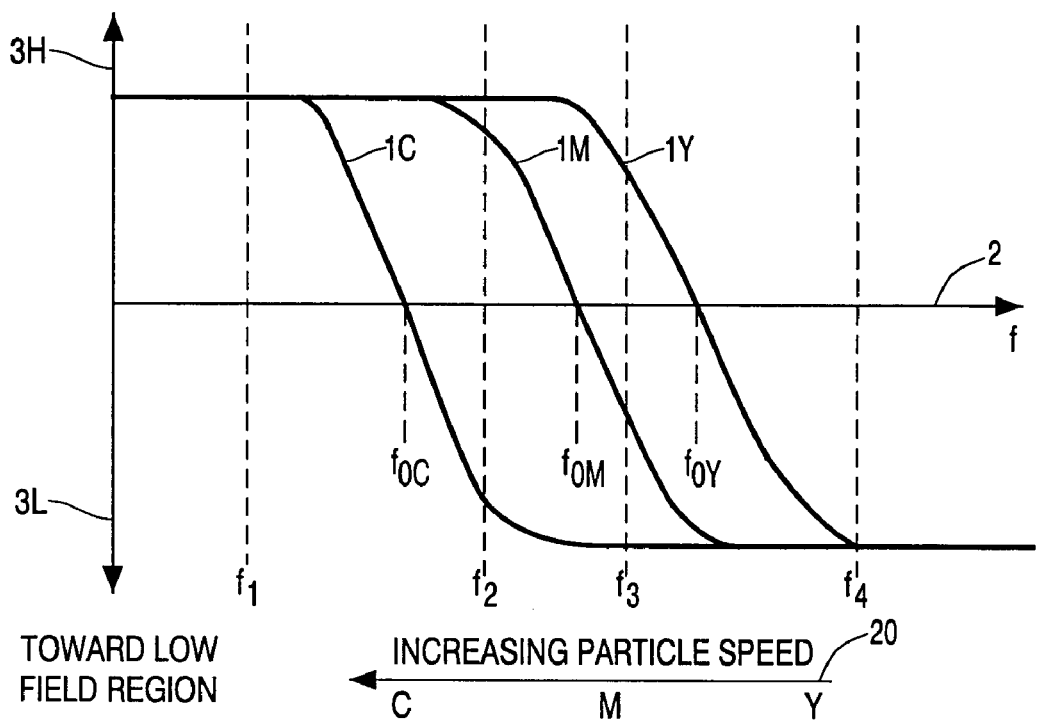
FIG. 2 shows the dielectrophoretic frequency characteristic of each different colour of particle and an indication of different speeds of the different colours of particles in a dielectrophoretic mixture.

The plural particles of each individual colour are made to have substantially the same dielectrophoretic frequency characteristic, in particular substantially the same transition frequency $f_0$, as each other. However, the dielectrophoretic frequency characteristic, in particular the transition frequency $f_0$, is made different between the three colours. FIG. 2 shows, using the same format and, where appropriate, the same reference numerals as FIG. 1, the dielectrophoretic frequency characteristic of each of the three colours of particle, namely plot 1C for the cyan particles, with transition frequency $f_{0C}$ plot 1M for the magenta particles, with transition frequency $f_{0M}$, and plot 1Y for the yellow particles, with transition frequency $f_{0Y}$. The plots 1C, 1M and 1Y have been normalised in FIG. 2 so that the forces on the particles away from the transition frequencies are shown at the same levels for each colour, although in practice the forces need not be the same strength for each colour. Also, the frequency axis 2 is not drawn to scale, and is instead adjusted in FIG. 2 to conveniently show the spaced apart transition frequencies of the three colours. In this embodiment, the transition frequencies are as follows: $f_{0C}=25$ kHz, $f_{0M}=250$ kHz and $f_{0Y}=2.5$ MHz.

The plural particles of each individual colour have substantially the same speed in the transparent liquid due to the electrophoretic effect as each other. However, the speed is made different between the three colours, with increasing speed in reverse order compared to increasing transition frequency, i.e. cyan particles are faster than the magenta particles which themselves are faster than the yellow particles, as represented in FIG. 2 by the increasing particle speed indicator 20. In this embodiment the speed of the cyan particles is of the order of ten times faster than the magenta, which itself is of the order of ten times greater than that of yellow. This order of difference is particularly suitable as it reliably allows separation of colours (as will be described below) whilst not introducing excessively long delays. However, the mixture may be formed with other differences in speed, provided the differences are sufficient to be made use of along the lines to be described in this and other embodiments below. When suitable, lesser-sized differences may be employed, including for example a factor of two difference.

Thus, the transparent particles are required to have increasing transition frequency and decreasing speed as one considers cyan then magenta then yellow. Any suitable transparent coloured semi-insulating particles may be used. The differing requirements may be achieved by any suitable selection of materials etc. However, in this embodiment, both increasing transition frequency and decreasing speed is conveniently achieved by using differently sized particles of the same semi-insulating material, namely latex dyed to the appropriate colour. The particles of each of the three colours are substantially spherically shaped, and may be for example approximately of the following diameters: cyan particles=8 µm; magenta particles=2 µm; yellow particles=0.5 µm.

The further items indicated in FIG. 2 relate to a possible operating scheme for a display device comprising the above described mixture, and will be described later below.

Figure 3:
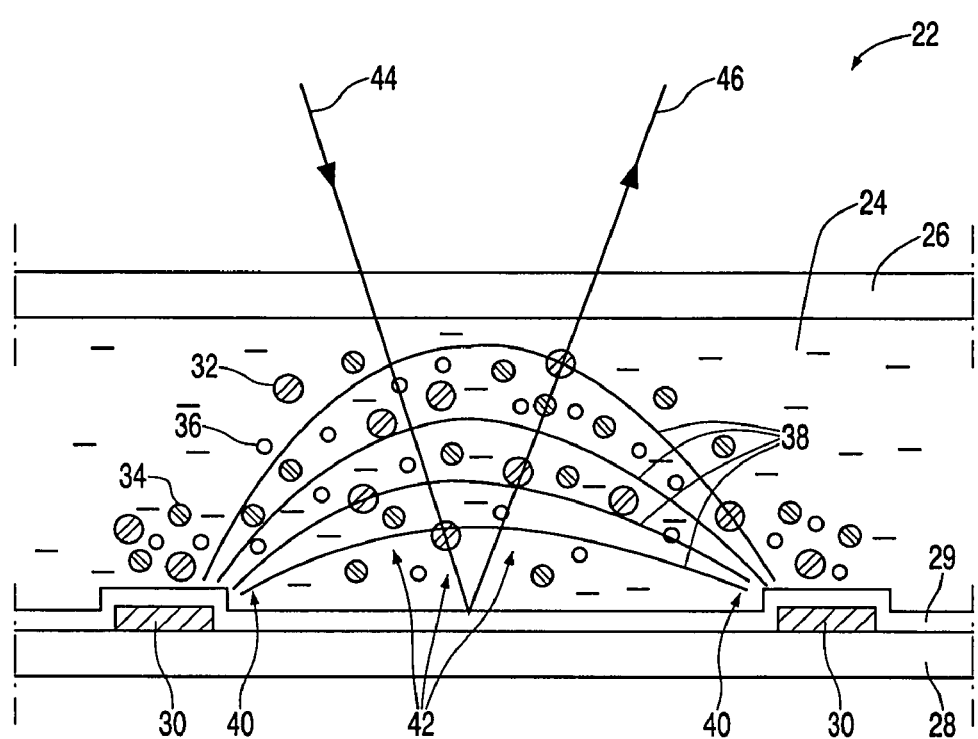
FIG. 3 shows a schematic, not to scale, cross-sectional view through one pixel of a dielectrophoretic display device in which the dielectrophoretic mixture of FIG. 2 is used as the light modulation material.

FIG. 3 shows a schematic, not to scale, cross-sectional view through one example pixel 22 of a dielectrophoretic display device in which the above described dielectrophoretic mixture is used as the light modulation material. The above mentioned transparent liquid (indicated by reference numeral 24) is held between two plates, which may conveniently be termed a top plate 26, which is transparent, and a bottom plate 28. These plates may be made of any conventional plate material such as materials conventionally used for display plates, such as glass or plastic. The bottom plate 28 has a white reflective coating 29 provided thereon. When, as in FIG. 3, the white reflective coating 29 is on the upper (i.e. inner) surface of the bottom plate 28, the bottom plate need not be transparent. However, the white reflective coating may alternatively be provided on the lower (i.e. outer) surface of the bottom plate 28, in which case the bottom plate 28 needs to be transparent.

The above mentioned transparent cyan particles (indicated by reference numeral 32), transparent magenta particles (indicated by reference numeral 34), and transparent yellow particles (indicated by reference numeral 36) are contained in the transparent liquid 24.

Electrodes 30, of any suitable deposited conductor, are provided on the upper (i.e. inner) surface of the bottom plate 28. The electrodes 30 are provided over only a small area compared to the area between them, i.e. only over a small proportion of the area of the pixel. In operation, the electrodes 30 are driven with alternating voltage so as to provide an electric field, represented in FIG. 3 by field lines 38, between the two electrodes 30. The electric field has relatively higher strength field regions 40 in the vicinity of the electrodes, where the field lines come relatively closer together, and a relatively lower strength field region 42 in the main area between the electrodes 30 and through the depth of the liquid between the plates 26 and 28, where the field lines are relatively further apart, as can be seen in principle schematically in FIG. 3.

In operation, input light 44 is directed to or falls on the transparent top plate 26, then passes through the transparent liquid 24, is reflected by the white reflective coating 29, passes back through the transparent liquid 24 and out again through the transparent top plate 26 to provide output light 46 (note the input light 44 and output light 46 are shown in FIG. 3 at an angle to the plate 26 merely for clarity). The input light 44 may for example be daylight or any other ambient light. As the electrodes 30 are of a small area compared to the area of the pixel 22, the colour of the output light will be substantially modulated by those particles which are in the main low field region 42 (i.e. this will be the main light modulation area), and will not be significantly affected by those particles which are in the high field regions 40.

The higher field regions 40 and lower field region 42 correspond to the two possible directions of force (respectively 3H and 3L) on the particles according to the dielectrophoretic frequency characteristic plots for each colour of particle as shown in FIG. 2.

Returning to FIG. 2, this further shows four drive frequencies $f_1$, $f_2$, $f_3$ and $f_4$ that are employed to drive the display device of this embodiment. The drive frequency $f_1$ is lower than $f_{0C}$, the drive frequency $f_2$ is between $f_{0C}$ and $f_{0M}$, the drive frequency $f_3$ is between $f_{0M}$ and $f_{0Y}$, and the drive frequency $f_4$ is higher than $f_{0Y}$.

As can be seen in FIG. 2, at a drive frequency $f_1$ each of the plots 1C, 1M and 1Y are above the frequency axis 2, i.e. the force on particles of all the three colours will be toward the high field regions 40 described with reference to the pixel shown in FIG. 3. Consequently, when the electric field of FIG. 3 is applied at the drive frequency $f_1$, the particles of all three colours will tend to move toward the high field regions 40, i.e. out of the main light modulating area of the pixel.

At a drive frequency $f_2$, the plots 1M and 1Y are still above the frequency axis 2, but the plot 1C is below the frequency axis 2. Thus the force on the magenta and yellow particles will be toward the high field regions 40, whereas the force on the cyan particles will be toward the low field region 42. Consequently, when the electric field of FIG. 3 is applied at the drive frequency $f_2$, the magenta and yellow particles will tend to move toward the high field regions 40, i.e. out of the main light modulating area of the pixel, whereas the cyan particles will tend to move toward the low field region 42, i.e. into the main light modulating area of the pixel.

At a drive frequency $f_3$, only the plot 1Y is still above the frequency axis 2, and the plots 1C and 1M are below the frequency axis 2. Thus the force on the yellow particles will be toward the high field regions 40, whereas the force on the cyan and magenta particles will be toward the low field region 42. Consequently, when the electric field of FIG. 3 is applied at the drive frequency $f_3$, the yellow particles will tend to move toward the high field regions 40, i.e. out of the main light modulating area of the pixel, whereas the magenta and cyan particles will tend to move toward the low field region 42, i.e. into the main light modulating area of the pixel.

Finally, at a drive frequency $f_4$ each of the plots 1C, 1M and 1Y are below the frequency axis 2, i.e. the force on particles of all the three colours will be toward the low field region 42. Consequently, when the electric field of FIG. 3 is applied at the drive frequency $f_3$, the particles of all three colours will tend to move toward the low field region 42, i.e. into the main light modulating area of the pixel.

The provision of different colours of display will now be described for a simple case in which for each colour of particles to be provided in the main light modulating area of the pixel, substantially all the particles of that colour of the pixel are provided in that area.

The pixel 22 is one pixel of an array of pixels of the display device. In conventional manner, the pixels of the array are addressed in turn to provide a frame of the image to be displayed. The pixel 22 is addressed each frame, with the following data signals applied to the electrodes.

Firstly, in order to "refresh" the pixel, an a.c. voltage at frequency $f_4$ is applied, thus tending to move the particles of all three colours into the low field region 42, i.e. the main light modulating area of the pixel. This voltage at frequency $f_4$ is applied for a duration long enough to allow substantially all of even the slowest colour of particles, namely the yellow particles, to succeed in moving to the main light modulating area (such a duration or "pulse length" is hereinafter referred to as "long", with the notation "L"). In this example this duration is L=5 ms. As this means substantially all the particles of all three colours are now in the main light modulating area, all wavelengths of the input light 44 are blocked, and the appearance of the pixel is black.

If the pixel is to display black this frame, addressing is now complete. However, if the pixel is to display a colour or white, then one or more further a.c. voltages are applied to move particles of given colours out of the low field region 42 and into the high field regions 40, leaving only those colours of particles required to display the colour required for the pixel (i.e. removing all the colours provides white output light as no particles are left; removing pairs of colours and leaving just the cyan, magenta or yellow particles provides respectively cyan, magenta or yellow output light; removing just the yellow particles and leaving the cyan and magenta particles provides blue output light; removing just the magenta particles and leaving the cyan and yellow particles provides green output light; and removing just the cyan particles and leaving the magenta and yellow particles provides red output light).

Depending on which colour or colours need to be moved away from the low field region 42 to the high field regions 40, different frequencies and different durations are used, as follows.

Referring again to FIG. 2, frequency $f_3$ is used to remove just the yellow particles, as at $f_3$ only the yellow particles will tend to move toward the high field regions 40. Furthermore, in order to allow the yellow particles (the slowest of the colours) sufficient time to move to the high field region, the a.c. voltage of frequency $f_3$ is applied for the above defined long duration.

Frequency $f_2$ is likewise used to move both the yellow and the magenta particles, as at $f_2$ both these colours of particles, but not the cyan particles, will tend to move toward the high field regions 40. As when moving just yellow particles, this a.c. voltage of frequency $f_2$ is applied for the above defined long duration in order to allow the yellow particles sufficient time to move to the high field region. Note also that since the magenta particles move at greater speed than the yellow particles, this long duration will also be sufficient to allow the magenta particles sufficient time to move to the high field regions 40.

Likewise, frequency $f_1$ is used to move all three colours of particles to the high field regions 40, again with the long duration in order to allow the slow yellow particles sufficient time to move.

It will be appreciated that the above choices represent the limit of selections of colour particles that may be moved using frequency control alone. This is because, as one is required to use frequencies further away from the refresh frequency (here the refresh frequency is $f_4$) to produce movement in colours whose transition frequencies are further away from the refresh frequency, those other colours whose transition frequencies are closer to the refresh frequency are inherently moved as well.

Other selections of colours to be moved are achieved by varying the duration of the applied a.c. voltage in relation to the varying particle speeds specified above, as follows.

Frequency $f_2$ is used to remove just the magenta particles, but is only applied for a duration that is long enough to allow substantially all the magenta particles to move to the high field regions 40, but that is not long enough to allow the slower moving yellow particles to leave the lower field region 42 (such a duration or "pulse length" is hereinafter referred to as "medium", with the notation "M"). In this example this duration is M=500 μs.

In order to remove the cyan and magenta particles, but not the yellow particles, frequency $f_1$ is used, but is only applied for the above defined medium duration, so that once again the yellow particles do not have time to leave the lower field region 42.

Frequency $f_1$ is also used to remove just the cyan particles, but is only applied for a duration that is long enough to allow substantially all the cyan particles to move to the high field regions 40, but that is not long enough to allow the slower moving magenta or yellow particles to leave the lower field region 42 (such a duration or "pulse length" is hereinafter referred to as "short", with the notation "S"). In this example this duration is S=50 μs.

The above combinations may be represented in tabular form as shown in Table 1, where the colours that are moved out from the low field region 42 (i.e. the main light modulation area) to the high field regions 40 are listed.

TABLE 1

| $f_1$ (L) C + Y + M | $f_2$ (L) Y + M | $f_3$ (L) Y | $f_4$ (L) — |
|---|---|---|---|
| $f_1$ (M) C + M | $f_2$ (M) M | $f_3$ (M) — | $f_4$ (M) — |
| $f_1$ (S) C | $f_2$ (S) — | $f_3$ (S) — | $f_4$ (S) — |

It can be seen that none of the above single frequency/duration combinations achieve removal of the cyan and yellow particles, but not the magenta particles. This is however achieved by applying an a.c. voltage of frequency $f_3$ for the long duration to remove the yellow particles followed by an a.c. voltage of frequency $f_1$ for the short duration to remove the cyan particles. (It is noted these may not be applied in the opposite order, as then the long duration voltage at frequency $f_3$ would bring the cyan particles back into the low field region 42.)

Figure 4:
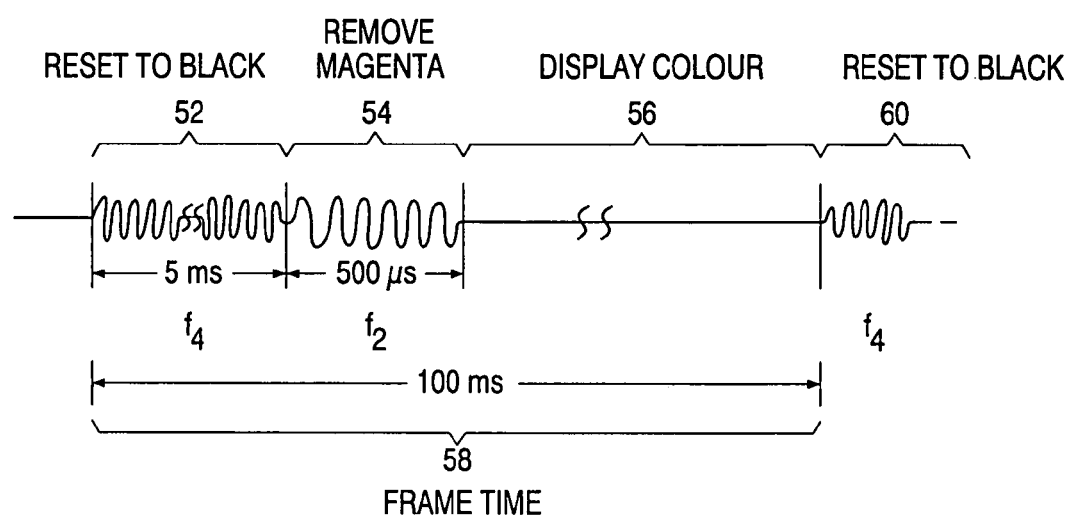
FIG. 4 shows driving voltages applied during one frame for the pixel of FIG. 3 when the pixel is to display green output light.

FIG. 4 shows, by way of example, the driving voltages applied during one frame 58, of length 100 ms, for the pixel 22 when the pixel 22 is to display green output light by leaving the yellow and cyan particles in the low field region 42. Initially the applied voltage at frequency $f_4$ is applied for 5 ms, providing a refresh action in which the pixel is reset to black (indicated by reference numeral 52). Then the applied voltage at frequency $f_2$ is applied for 500 μs, causing the removal of the magenta particles (indicated by reference numeral 54). For the remaining time of the frame 58, the remaining yellow and cyan particles provide output display light to be coloured green (indicated by reference numeral 56). FIG. 4 further shows the start of the next frame, when the applied voltage at frequency $f_4$ is again applied to reset the pixel to black again (indicated by reference numeral 60).

Figure 5:
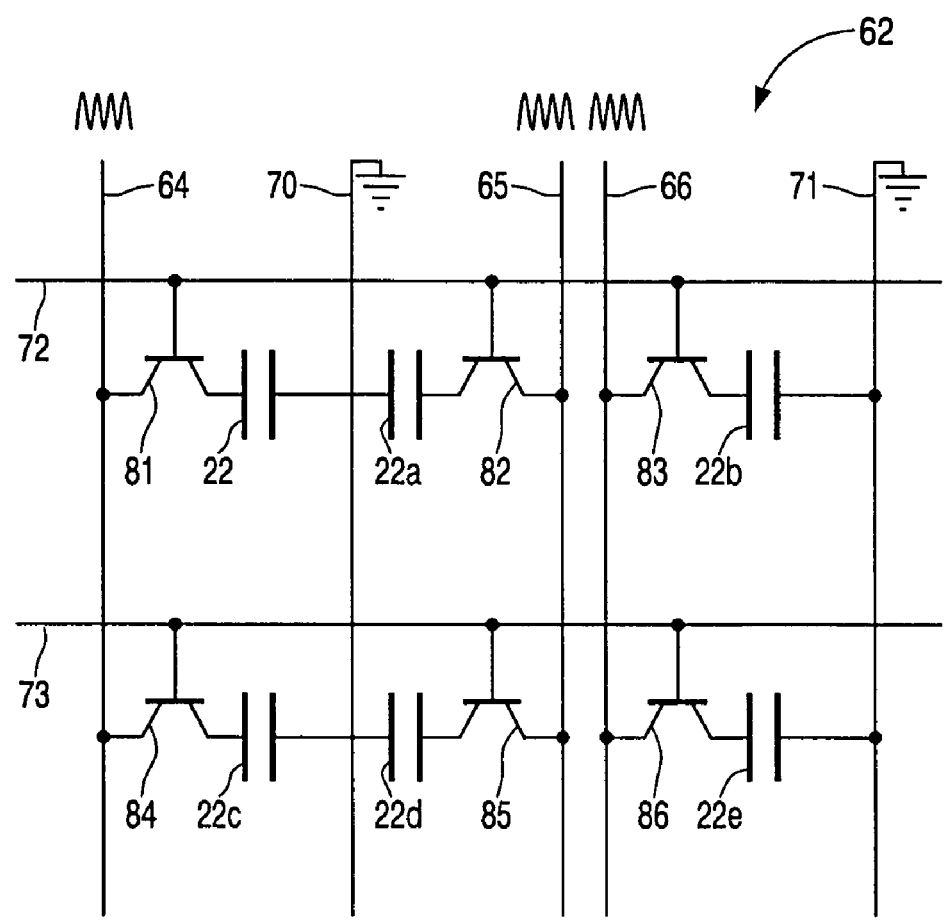
FIG. 5 shows a circuit diagram of an active matrix array provided on a bottom plate of a display device comprising the pixel of FIG. 3.

FIG. 5 shows a circuit diagram of an active matrix array 62, provided on the bottom plate 28 of the display device, for delivering the above described applied voltages to the pixel 22 and the other pixels of the device (for clarity the array is only shown for pixel 22 and five other pixels, namely pixels 22a–22e, but in practice comprises many more pixels). The voltages are applied to each of the pixels 22–22e via a respective thin film transistor (TFT) 81–86. The pixels and TFTs are arrayed in rows and columns. Each row is provided with an address line 72, 73 for selecting the pixels for driving on a row at a time basis (by turning on the respective TFTs). Each column is provided with a separate data line 64–66 for providing the applied voltage signal, and earth lines 70, 71 are shared between two adjacent columns as shown. In operation, pixel addressing on a line-by-line basis is implemented using conventional display driving electronics adapted to provide the different frequencies and durations described above.

In the above simple case, for each colour of particles to be provided in the main light modulating area of the pixel, substantially all the particles of that colour of the pixel are provided in that area. In order, instead, to also display colour mixes (hues) with differing proportions or densities of the colour particles of the respective subtractive primary colours, the respective frequencies are applied for durations intermediate the above defined short, medium and long durations. This moves required proportions of each colour of particle out of the low field region 42 and into the high field regions 40.

FIG. 6 shows four example pixels of a display device of a further embodiment (schematically and not to scale). In this embodiment, a dielectrophoretic mixture of the type described above is encapsulated in transparent polymer capsules 90 (also known as microcapsules) using known techniques, as disclosed for example in U.S. Pat. No. 5,961,804, the contents of which are disclosed herein by reference. Thus each capsule 90 contains the transparent liquid 24, transparent cyan coloured particles 32, transparent magenta coloured particles 34 and transparent yellow coloured particles 36. The device again comprises a transparent top plate 26 and a bottom plate 28, the bottom plate 28 having a white reflective coating 29 provided thereon.

The top plate 26 and bottom plate 28 are spaced apart by a distance approximately equal to the diameter of the capsules 90, so as to provide a layer of capsules one capsule thick. Input light 44 thus passes through a capsule 90, is reflected by the white reflective coating 29, passes through the capsule 90 again and exits the device as output light modulated according to which coloured particles it has passed through.

Relatively large area electrodes 30a–30d, extending over the majority of the width of capsule 90 are provided on the inner surface of the bottom plate 28. Relatively small area electrodes 31a–31d, extending over only the extreme part of the capsules and any gaps between adjoining capsules are provided on the inner surface of the transparent top plate 26. The arrangement of electrodes 30a–d, 31a–d allows each or several capsules to serve as one pixel of the display device.

Each pixel is addressed with applied voltages of different frequency and/or duration, as described above for the first embodiment, to achieve the different display colours in the same way as described above, except where stated otherwise below. In particular, low and high field regions are again provided, such that the low field region corresponds substantially to the main light modulating area of the pixel, i.e. the area over respective ones of the large electrodes 30a–d on the bottom plate 28, and the high field region corresponds substantially to a much smaller area, the area below respective ones of the small electrodes 31a–d on the transparent top plate 26. Depending on the overlap of these areas, the top electrodes 31a–31d may be provided in the form of transparent electrodes.

FIG. 7 schematically illustrates one way that the high and low field regions may be provided in the pixels/capsules of FIG. 6. The features of the device are indicated by the same reference numerals as used in FIG. 6. For clarity only one pixel/capsule is shown. Also for clarity, the white reflective layer 29, and the coloured particles 32, 34, 36, are omitted from FIG. 7.

The two electrodes 31a, 31b on the transparent top plate 26 either side of the capsule 90 are each driven at the same alternating potential, which is driven relative to the potential of the electrode 30a provided on the bottom plate 28 (i.e. under the capsule 90). Thus, electric fields are provided between electrode 31a and electrode 30a, represented by field lines 38a, and between electrode 31b and electrode 30a, represented by field lines 38b.

The electric fields have respective relatively higher strength field regions 40a, 40b in the vicinity of the top electrodes 31a, 31b, where the field lines 38a, 38b come relatively closer together, and a relatively lower strength field region 42 in the main area above the bottom electrode 30a, where the field lines 38a, 38b are relatively further apart, as can be seen in principle schematically in FIG. 7.

FIG. 8 schematically illustrates another way that the high and low field regions may be provided in the pixels/capsules of FIG. 6. The features of the device are again indicated by the same reference numerals as used in FIG. 6. Again, for clarity only one pixel/capsule is shown, and also the white reflective layer 29, and the coloured particles 32, 34, 36, are omitted from FIG. 8.

The two top electrodes 31a, 31b on the transparent top plate 26 either side of the capsule 90 are driven with an alternating potential between them, for example between 0 and 10V. Thus an electric field, represented by field lines 38, is provided between these electrodes 31a and electrode 30a.

The electric field has relatively higher strength field regions 40a, 40b in the vicinity of the top electrodes 31a, 31b, where the field lines 38 come relatively closer together, and a relatively lower strength field region 42 in the main area above the bottom electrode 30a, where the field lines 38 are relatively further apart, as can be seen in principle schematically in FIG. 7.

In this example, the electric field is modified using the electrode 30a provided on the bottom plate 28 (i.e. under the capsule 90) to improve the distribution of the coloured particles in the pixel. Such an arrangement and technique may be applied in other embodiments where appropriate. In this example, the lower field region 42 has been modified by being extended further into the depth of the particle 90 than would otherwise be the case by virtue of the electrode 30a being held at a potential, say 5V, between the alternating potentials of the top electrodes 31a, 31b.

In the above embodiments each colour of particle has a dielectrophoretic characteristic approximately of the form shown in FIG. 1. However, other particles, for example more complex particles with multi-layered structures, have a dielectrophoretic characteristic of the form shown in FIG. 9 (in which features the same as in FIG. 1 are given the same reference numerals). FIG. 9 shows a plot 201 showing the force on a particle due to the dielectrophoretic effect as a function of the applied frequency (f). As with the earlier plot 1 in FIG. 1, for plot 201 in FIG. 9 the force on the particle again varies either side of a transition frequency $f_0$ between being toward a higher field region (3H) and toward a lower field region (3L). However, the plot 201 (and hence the dielectrophoretic frequency characteristic shown in FIG. 9) differs from the plot 1 (and hence the dielectrophoretic frequency characteristic shown in FIG. 1) in that the force on the particles (and hence the dielectrophoretic movement of the particles) changes from being toward the lower field region to toward the higher field region with increasing frequency for plot 201 whereas the force on the particles (and hence the dielectrophoretic movement of the particles) changes from being toward the higher field region to toward the lower field region with increasing frequency for plot 1. This may be referred to as having a reversed sign of the dielectrophoretic force, or as having a reversed sense dielectrophoretic characteristic.

In a further range of embodiments, the embodiments described above are each implemented with yellow coloured particles having a reversed sign of the dielectrophoretic force (i.e. a dielectrophoretic characteristic as represented by plot 201 of FIG. 9 rather than as represented by plot 1 of FIG. 1).

FIG. 10 shows the dielectrophoretic frequency characteristic of each of the three colours of particle, namely plot 1C for the cyan particles, with transition frequency $f_{OC}$, plot 1M for the magenta particles, with transition frequency $f_{OM}$, and plot 201Y for the yellow particles, with transition frequency $f_{OY}$. The plots 1C, 1M and 201Y have been normalised in FIG. 10 so that the forces on the particles away from the transition frequencies are shown at the same levels for each colour, although in practice the forces need not be the same strength for each colour. Also, the frequency axis 2 is not drawn to scale, and is instead adjusted in FIG. 10 to conveniently show a significant spacing apart of the transition frequencies of the two colours with the same sense dielectrophoretic frequency characteristic, namely cyan and magenta. The transition frequency of the yellow particles may conveniently lie near or equal either of $f_{OC}$ and $f_{OM}$, and here for example is near $f_{OM}$. In this embodiment, the transition frequencies are as follows: $f_{OC}$=25 kHz, $f_{OM}$=250 kHz, and $f_{OY}$=240 kHz.

The plural particles of each individual colour again have substantially the same speed in the transparent liquid due to the electrophoretic effect as each other. Also, the speed is again made different between the three colours, with the yellow particles being faster than the cyan particles which themselves are faster than the magenta particles, as represented in FIG. 10 by the increasing particle speed indicator 220. In this embodiment the speed of the yellow particles is again of the order of ten times faster than the cyan, which itself is of the order of ten times greater than that of the magenta. However, again the mixture may be formed with other sizes of difference in speed, provided the differences are sufficient to be made use of along the lines to be described in this and other embodiments below.

FIG. 10 further shows three drive frequencies $f_1$, $f_2$, and $f_3$ that are employed to drive the display device of this embodiment. The drive frequency $f_1$ is lower than $f_{OC}$, the drive frequency $f_2$ is higher than $f_{OC}$ but lower than $f_{OM}$ and $f_{OY}$, and the drive frequency $f_3$ is higher than $f_{OM}$ and $f_{OY}$.

As can be seen in FIG. 10, at a drive frequency $f_1$, the plots 1C and 1M are above the frequency axis 2, but the plot 201Y is below the frequency axis 2. Thus the force on the cyan and magenta particles will be toward the high field regions 40, whereas the force on the yellow particles will be toward the low field region 42. Consequently, when the electric field is applied at the drive frequency $f_1$, the cyan and magenta particles will tend to move toward the high field regions 40, i.e. out of the main light modulating area of the pixel, whereas the yellow particles will tend to move toward the low field region, i.e. into the main light modulating area of the pixel.

At a drive frequency $f_2$, the plot 1M is above the frequency axis 2, and the plots 1C and 201Y are below the frequency axis 2. Thus the force on the magenta particles will be toward the high field regions 40, whereas the force on the cyan and yellow particles will be toward the low field region 42. Consequently, when the electric field is applied at the drive frequency $f_2$, the magenta particles will tend to move toward the high field regions 40, i.e. out of the main light modulating area of the pixel, whereas the cyan and yellow particles will tend to move toward the low field region, i.e. into the main light modulating area of the pixel.

At a drive frequency $f_3$, the plot 201Y is above the frequency axis 2, and the plots 1C and 1M are below the frequency axis 2. Thus the force on the yellow particles will be toward the high field regions 40, whereas the force on the cyan and magenta particles will be toward the low field region 42. Consequently, when the electric field of FIG. 3 is applied at the drive frequency $f_3$, the yellow particles will tend to move toward the high field regions 40, i.e. out of the main light modulating area of the pixel, whereas the magenta and cyan particles will tend to move toward the low field region, i.e. into the main light modulating area of the pixel.

The provision of different colours at the pixel will again be described for a simple case in which for each colour of particles to be provided in the main light modulating area of the pixel, substantially all the particles of that colour of the pixel are provided in that area.

In order to "refresh" the pixel, an a.c. voltage at frequency $f_3$ is applied for the above defined "long" duration, which in this example is long enough to move even the slowest magenta particles. This moves the magenta and cyan particles into the low field region 42, i.e. the main light modulating area of the pixel. However, at frequency $f_3$ the yellow particles will have been moved to the high field regions 40. Therefore, in order to provide black as the refresh mode, another a.c. voltage at frequency $f_1$ is then applied to move the yellow particles into the low field region 42. This is only applied for the earlier defined "short" duration, to prevent the cyan and magenta particles having sufficient time to move back out of the low field region 42 to the high field regions 40 under the action of the $f_1$ frequency. (Alternatively, $f_2$ may be used, in which case this may be applied for the above defined "medium" duration, as then the duration need only be short enough to present the magenta particles from moving out).

If the pixel is to display black, addressing is now complete. However, if the pixel is to display a colour or white, then one or more further a.c. voltages are applied to move particles of given colours out of the low field region 42 and into the high field regions 40, leaving only those colours of particles required to display the colour required for the pixel.

Depending on which colour or colours need to be moved away from the low field region 42 to the high field regions 40, different frequencies and different durations are used, as follows.

Referring again to FIG. 10, frequency $f_3$ is used to remove just the yellow particles, as at $f_3$ only the yellow particles will tend to move toward the high field regions 40. In this example the yellow particles are the fastest, therefore the $f_3$ frequency need only be applied for the short duration, although medium or long duration may be used if more convenient.

Frequency $f_2$ is used to remove just the magenta particles, as at $f_2$ only the magenta particles will tend to move toward the high field regions 40. Furthermore, in order to allow the magenta particles (the slowest of the colours) sufficient time to move to the high field regions 40, the a.c. voltage of frequency $f_3$ is applied for the long duration.

Frequency $f_1$ may be used to remove both the cyan and the magenta particles, as at $f_1$ both these colours of particles, but not the yellow particles, will tend to move toward the high field regions 40. This a.c. voltage of frequency $f_1$ is applied for the above defined long duration in order to allow the magenta particles sufficient time to move to the high field regions 40. Note also that since the cyan particles move at greater speed than the magenta particles, this long duration will also be sufficient to allow the cyan particles sufficient time to move to the high field regions 40.

Frequency $f_1$ is also used to remove just the cyan particles, by applying $f_1$ for the medium duration, since this duration will allow the cyan particles sufficient time to move to the higher field regions 42, but not the slower magenta particles.

The above combinations may be represented in tabular form as shown in Table 2, where the colours that are moved out from the low field region 42 (i.e. the main light modulation area) to the high field regions 40 are listed.

TABLE 2

| | | |
|---|---|---|
| $f_1$ (L) C + M | $f_2$ (L) M | $f_3$ (L) Y |
| $f_1$ (M) C | $f_2$ (M) — | $f_3$ (M) Y |
| $f_1$ (S) — | $f_2$ (S) — | $f_3$ (S) Y |

It can be seen that each of the colours may be individually removed. Combinations of colours are removed by applying the appropriate individual frequency/pulse combinations sequentially.

To remove both the yellow particles and the cyan particles, $f_1$(M) may be applied followed by $f_3$ (S)–these must be done in this order, because if done in the other order, the yellow particles would come back in under the action of $f_1$ (M).

To remove both the yellow particles and the magenta particles, $f_2$ (L) may be applied followed by $f_3$ (S) or $f_3$ (M).

Cyan and magenta may both be removed by $f_2$ (L) followed by $f_1$ (M), or with the single frequency/duration combination $f_1$ (L).

All three colours may be removed by applying $f_2$ (L) followed by $f_1$ (M) followed by $f_3$ (S).

Similar considerations apply with respect to materials for the particles as were discussed with reference to the earlier embodiments. For example, size of particles may be used to define their speed characteristics and/or transition frequency. In these embodiments it is not however possible to use the same material for all three colours of particles, as one of the colours (here yellow) is required to have a reversed sense dielectrophoretic frequency characteristic as per plot 201 in FIG. 9 (i.e. reversed sign of the dielectrophoretic force).

The provision of transparent semi-insulating particles displaying the dielectrophoretic frequency characteristic shown by plot 201 may be implemented using shell structures to reverse the sign of the dielectrophoretic force as disclosed in Electromechanics of Particles by Thomas B. Jones, Cambridge University Press, 1995, pages 238–247, this particular subject matter being included herein by reference. FIG. 11 shows a shell structure semi-insulating particle 250 with a reversed sense dielectrophoretic frequency characteristic (as e.g. plot 201) that maintains transparency by using a transparent indium tin oxide (ITO) layer 254 rather than solid conducting material. The full structure comprises a polymer core 252, and the following layers working outward from the core: the ITO layer 254, an insulator layer 256, and an outer polymer layer 258 as a semi-insulating material.

(One can also reverse the sign of the dielectrophoretic force by changing the ratio of the conductivities of the transparent liquid and the surface of a particle without needing a shell structure.)

In the above embodiments, the pixel is refreshed by being reset to black. However, in further embodiments, the pixel may instead be refreshed by being reset to white. For example, FIG. 12 shows a dielectrophoretic mixture corresponding to that described above with reference to FIG. 2 (with the same reference numerals used for the same features), except that in this mixture the yellow particles are faster than the magenta particles, which are themselves faster than the cyan particles, as represented by the increasing particle speed indicator 230 (i.e. the speed order is reversed compared to FIG. 2). The pixel is refreshed by application of frequency $f_1$ for the long duration, $f_1$ (L), i.e. long enough for even the slowest particle colour, this time cyan, to move. This moves substantially all the particles of all three colours from the low field region 42 to the high field regions 40, i.e. out of the main light modulating area, thus providing white. To provide a required colour for the pixel, the pixel is then addressed with the appropriate frequency/duration combination (or sequential combinations) of applied voltage according to the contents of Table 3, which shows which colour (or colours) of particles moves into the main light modulating area for different frequency/duration combinations.

TABLE 3

| | | | |
|---|---|---|---|
| $f_1$ (L) — | $f_2$ (L) C | $f_3$ (L) C + M | $f_4$ (L) C + M + Y |
| $f_1$ (M) — | $f_2$ (M) — | $f_3$ (M) M | $f_4$ (M) M + Y |
| $f_1$ (S) — | $f_2$ (S) — | $f_3$ (S) — | $f_4$ (S) Y |

The above described use of white refresh may also be applied to reverse force mixtures such as those described with reference to FIG. 10.

In all the above embodiments, the electrodes are arranged such that movement of the particles toward the relatively high field region corresponds to movement out of the main light modulating area, and movement of the particles toward the relatively lower field region corresponds to movement into the main light modulating area. However, in further embodiments, the electrodes may instead be arranged such that the reverse occurs, i.e. such that movement of the particles toward the relatively high field region corresponds to movement into the main light modulating area, and movement of the particles toward the relatively lower field region corresponds to movement out of the main light modulating area.

One electrode arrangement 250 which may be used to provide this is shown, by way of example, in FIG. 13, where the same reference numerals are used for those features already described and where the coloured particles and the white reflective layer 29 are omitted for clarity. The electrode arrangement 250 comprises a small opaque electrode 252 (e.g. of aluminium) on the inner surface of the top plate 26 and two large transparent electrodes 255a and 255b (e.g. of ITO) on the inner surface of the bottom plate 28. In operation, the alternating voltage is applied between the two large electrodes 255a, 255b to provide an electric field, represented by field lines 238, therebetween. This provides high field regions 40 at the large electrodes 255a, 255b and a low field region 42 below the small electrode 252. The small electrode 252 is held at a potential intermediate those of the two large electrodes 255a, 255b to modify the field lines 238 so as to amplify this effect. The main area on which light falls is the area corresponding to the large electrodes, and hence the main visual effect seen is for that area, which therefore provides the main light modulating area. The opaqueness of the small electrode 252 further supports this effect.

In one of these embodiments a dielectrophoretic mixture of the type described above with reference to FIG. 12 may be used, in which the yellow particles are faster than the magenta particles, which are themselves faster than the cyan particles, as represented by the increasing particle speed indicator 230. The pixel is refreshed by application of frequency $f_1$ for the long duration, $f_1$ (L), which moves substantially all the particles into the main light modulating area provided by the large electrodes 255a, 255b, thus giving black reset. To provide a required colour for the pixel, the pixel is then addressed with the appropriate frequency/duration combination (or sequential combinations) of applied voltage according to the contents of Table 4, which shows which colour (or colours) of particles moves out of the main light modulating area for different frequency/duration combinations.

TABLE 4

| | | | |
|---|---|---|---|
| $f_1$ (L) — | $f_2$ (L) C | $f_3$ (L) C + M | $f_4$ (L) C + M + Y |
| $f_1$ (M) — | $f_2$ (M) — | $f_3$ (M) M | $f_4$ (M) M + Y |
| $f_1$ (S) — | $f_2$ (S) — | $f_3$ (S) — | $f_4$ (S) Y |

(Note that although these entries are the same as those in Table 3, the two tables are for different directions of movement.)

The above described reversal of high/low field relationship compared to in/out movement may also be applied to reverse force mixtures such as those described with reference to FIG. 10.

We return now to examples where the electrodes are arranged such that movement of the particles toward the relatively high field region corresponds to movement out of the main light modulating area, and movement of the particles toward the relatively lower field region corresponds to movement into the main light modulating area; and where particles of one of the colours has a reverse force characteristic (i.e. a reversed sense dielectrophoretic frequency characteristic), as in FIG. 10 for example, where yellow is reversed. Further embodiments of these types will now be described with reference to FIGS. 14–16, which each show a dielectrophoretic mixture corresponding to that described above with reference to FIG. 10 (with the same reference numerals used for the same features), but differing over FIG. 10 by virtue of the relative orders of speeds of the differently coloured particles.

In the mixture of FIG. 14, the cyan particles are faster than the magenta particles, which are themselves faster than the yellow particles, as represented by the increasing particle speed indicator 260 (i.e. the yellow particles are now the slowest). The pixel is refreshed by application of frequency $f_2$ for the long duration (i.e. long enough to move even the slowest colour particles, which here are the yellow ones), which moves the yellow and cyan particles into the low field region 42, followed by application of frequency $f_3$ for the medium duration, which moves the magenta particles into the low field region 42 thus providing black (i.e. $f_2$ (L) then $f_3$ (M) ). Another possibility providing black is to apply $f_1$ (L) followed by $f_3$ (M). To provide a required colour for the pixel, the pixel is then addressed with the appropriate frequency/duration combination (or sequential combinations) of applied voltage according to the contents of Table 5, which shows which colour (or colours) of particles moves out of the main light modulating area for different frequency/duration combinations.

TABLE 5

| | | |
|---|---|---|
| $f_1$ (L) C + M | $f_2$ (L) M | $f_3$ (L) Y |
| $f_1$ (M) C + M | $f_2$ (M) M | $f_3$ (M) — |
| $f_1$ (S) C | $f_2$ (S) — | $f_3$ (S) — |

In the mixture of FIG. 15, the cyan particles are faster than the yellow particles, which are themselves faster than the magenta particles, as represented by the increasing particle speed indicator 270 (i.e. the speed of the yellow particles is now between that of the cyan ones and that of the magenta ones). The pixel may be refreshed, for example, by application of frequency $f_3$ for the long duration (i.e. long enough to move even the slowest colour particles, which here are the magenta ones), which moves the magenta and cyan particles into the low field region 42, followed by application of frequency $f_2$ for the medium duration, which moves the yellow particles into the low field region 42 thus providing black (i.e. $f_3$ (L) then $f_2$(M)). To provide a required colour for the pixel, the pixel is then addressed with the appropriate frequency/duration combination (or sequential combinations) of applied voltage according to the contents of Table 6, which shows which colour (or colours) of particles moves out of the main light modulating area for different frequency/duration combinations.

TABLE 6

| | | |
|---|---|---|
| $f_1$ (L) C + M | $f_2$ (L) M | $f_3$ (L) Y |
| $f_1$ (M) C | $f_2$ (M) — | $f_3$ (M) Y |
| $f_1$ (S) C | $f_2$ (S) — | $f_3$ (S) — |

In the mixture of FIG. 16, the yellow particles are approximately the same speed as the cyan particles, and both are faster than the magenta particles, as represented by the increasing particle speed indicator 280. Thus, there are potential economies in particle manufacture. Also, there is only a need to provide two durations (pulse lengths) of applied voltage, say a long duration (long enough to move even the slowest (i.e. magenta) particles) and a short duration (too short to move the magenta particles, but long enough to move the cyan and yellow particles). The pixel may be refreshed, for example, by application of frequency $f_3$ for the long duration, which moves the magenta and cyan particles into the low field region 42, followed by application of frequency $f_2$ for the short duration, which moves the yellow particles into the low field region 42 thus providing black (i.e. $f_3$ (L) then $f_2$ (S)). To provide a required colour for the pixel, the pixel is then addressed with the appropriate frequency/duration combination (or sequential combinations) of applied voltage according to the contents of Table 7, which shows which colour (or colours) of particles moves out of the main light modulating area for different frequency/duration combinations.

TABLE 7

| | | |
|---|---|---|
| $f_1$ (L) C + M | $f_2$ (L) M | $f_3$ (L) Y |
| $f_1$ (S) C | $f_2$ (S) — | $f_3$ (S) Y |

In all the above embodiments, the use of all three subtractive primary colours allows provision of a full colour display at each pixel. In some applications, however, it may be sufficient to have a display that provides a limited range of colours as provided by two of the three subtractive primary colours. Embodiments using coloured particles of just two of the subtractive primary colours will now be described with reference to FIGS. 17 and 18. These embodiments provide potential economies in particle manufacture. Also, there is only a need to provide two durations (pulse lengths) of applied voltage, say a long duration (long enough to move even the slower colour of particles) and a short duration (too short to move the slower colour particles, but long enough to move the faster colour particles).

FIG. 17 shows a dielectrophoretic mixture corresponding to that described above with reference to FIG. 2 (with the same reference numerals used for the same features), except that only cyan and magenta particles are included. The cyan particles are again faster than the magenta particles, as represented by the increasing speed indicator 290. The pixel may be refreshed, for example, by application of frequency $f_3$ for the long duration, i.e. $f_3$ (L), which moves the magenta and cyan particles into the low field region 42, thus providing blue. To provide a required colour for the pixel, the pixel is then addressed with the appropriate frequency/duration combination (or sequential combinations) of applied voltage according to the contents of Table 8, which shows which colour (or colours) of particles moves out of the main light modulating area for different frequency/duration combinations.

TABLE 8

| | | |
|---|---|---|
| $f_1$ (L) C + M | $f_2$ (L) M | $f_3$ (L) — |
| $f_1$ (S) C | $f_2$ (S) — | $f_3$ (S) — |

FIG. 18 shows a dielectrophoretic mixture corresponding to that described above with reference to FIG. 10 (with the same reference numerals used for the same features), except that (i) only cyan and yellow particles are included, and (ii) the cyan particles are faster than the yellow particles, as represented by the increasing speed indicator 300, and only two frequencies ($f_1$ and $f_3$) need be applied. The pixel may be refreshed, for example, by application of frequency $f_1$ for the long duration, which moves the yellow particles into the low field region 42, followed by application of frequency $f_3$ for the short duration, which moves the cyan particles into the low field region, thus providing green (i.e. $f_1$ (L) then $f_3$ (S)). To provide a required colour for the pixel, the pixel is then addressed with the appropriate frequency/duration combination (or sequential combinations) of applied voltage according to the contents of Table 9, which shows which colour (or colours) of particles moves out of the main light modulating area for different frequency/duration combinations.

TABLE 9

| | |
|---|---|
| $f_1$ (L) C | $f_3$ (L) Y |
| $f_1$ (S) C | $f_3$ (S) — |

To move both the cyan and yellow particles out of the main light modulating area, frequency $f_3$ is applied for the long duration followed by application of frequency $f_1$ for the short duration, i.e. $f_3$ (L) then $f_1$ (S).

The use of coloured particles of just two of the subtractive primary colours may be applied to any of the other earlier described embodiments where suitable.

All the above embodiments are merely examples, and many details and aspects may be changed, as will now be discussed.

It was explained above that the particles may be provided with positive sign of the dielectrophoretic force (i.e. as per plot 1 of FIG. 1) or reversed sign of the dielectrophoretic force (i.e. as per plot 201 of FIG. 9). In some of the above embodiments (e.g. FIG. 2) the particles of each colour have positive sign of the dielectrophoretic force. It is to be appreciated that in all such embodiments the particles of each colour may alternatively have reversed sign of the dielectrophoretic force, with the relative order of speeds of the colours and the required selections of frequency/duration combinations being adapted accordingly. In some of the above embodiments (e.g. FIG. 10) the particles of one of the colours have reversed sign of the dielectrophoretic force and the particles of the remaining two colours have positive sign of the dielectrophoretic force. It is to be appreciated that, in all such embodiments, instead the particles of just one of the colours may have positive sign of dielectrophoretic force, with the particles of the remaining two colours having reversed sign of the dielectrophoretic force.

In the above embodiments, for each colour of particles to be provided in or moved out of the main light modulating area of the pixel, substantially all the particles of that colour of the pixel are provided in or moved out of that area. In order to also display colour mixes with differing proportions (hues) or densities (tones) of the colour particles of the respective subtractive primary colours, the respective frequencies $f_1$–$f_3$ are applied for durations intermediate the above defined short, medium and long durations. This moves required proportions of each colour of particle out of the low field region and into the high field regions or out of the high field regions and into the low field region to provide desired colour hues and/or tones.

In the above embodiments, due to manufacturing and design tolerances, the respective transition frequencies of the particles of any single colour may be different from each other to the extent of such tolerances. This will not prevent successful implementation, so long as any spread in such values (e.g. the spread in transition frequency values of the cyan particles around a nominal or mean value of the cyan particles) is sufficiently small compared to the difference between the values of the transition frequency of the different colours (e.g. the difference between the nominal or mean transition frequency of the cyan particles and the nominal or mean transition frequency of, say, the magenta particles). In other words, the dielectrophoretic frequency characteristics, in particular the transition frequency, of the particles of a given colour may be the same, substantially the same, or at least similar, to each other. Furthermore, such a spread may be provided and/or used on purpose as another way of providing differing proportions (hues) or densities (tones) of the colour particles of the respective subtractive primary colours, by using driving frequency values that lie in the spread of a colour's transition frequency, for example by varying the driving frequency within the transition frequency spread of a given colour so as to move a corresponding proportion of the particles.

All the embodiments have been described in terms of specific particle characteristics being allocated respectively to a particular colour of the three subtractive primary colours, e.g. in FIG. 2, the cyan particles have the lowest transition frequency and the highest speed, the magenta particles have the intermediate transition frequency and the intermediate speed, and the yellow particles have the highest transition frequency and the lowest speed. It is to be appreciated however that in all the above embodiments such allocation of the three colours, i.e. the question of which of the three types of particles are given which of the three colours, is merely an example, and may instead be interchanged in any combination. For example, in the FIG. 2 case, one alternative is the magenta particles may be provided with the lowest transition frequency and the highest speed, and the yellow particles may be provided with the intermediate transition frequency and the intermediate speed, with the cyan particles being provided with the highest transition frequency and the lowest speed. In another example, the yellow particles may be provided with the lowest transition frequency and the highest speed, and the magenta particles may be provided with the intermediate transition frequency and the intermediate speed, with the cyan particles being provided with the highest transition frequency and the lowest speed; and so on. Similarly, any pair of colours may be employed in the embodiments described with reference to FIGS. 17 and 18. Of course, in all cases where the colours are interchanged compared to the above examples, selection details including those in Tables 1–9 will change correspondingly.

Although in the above embodiments certain exemplary details of the materials and shape of the coloured particles are described, it will be appreciated that any suitable materials and shapes may be employed. Likewise, any combination of material, size, shape, surface treatment etc. may be employed to derive particles of suitable dielectrophoretic frequency characteristic and speed of movement. The particles may be provided with absolute transition frequency values other than those recited above. Control of such characteristics may also include variation in the transparent liquid containing the particles. Turning specifically to the transparent liquid, this may be of any suitable material. The transparent liquid is preferably colourless, but may have a white colour, in which case the white reflective layer may be omitted.

The values included for the driving voltage level, including the driving frequencies and durations (pulse lengths) are also merely examples, and may be varied as required to fit any specific mixture characteristics. Likewise, the driving circuit may be of any suitable arrangement for providing different frequencies, durations, forms of frame addressing, and so on. Further, other types of pixel array, e.g. dot matrix, may be used.

The electrode arrangements may be varied compared to those described in the above embodiments, and likewise the differing extents or relative strengths of the high and low field regions. Furthermore, varying the electrode arrangements may provide different ways in which a main light modulating area is provided for the pixel. With respect to this latter aspect, light shielding may also be provided to block certain areas of the pixel area from modulating input light if desired. Such shielding may readily be provided using conventional flat panel display technology, for example through the deposition of aluminium or an opaque insulating layer (e.g. on the inner surface of the top plate 26 at the locations directly opposite each of the small electrodes 30).

In all the above embodiments the display device is a reflective device, with a white reflective layer reflecting the input light such that it makes two passes through the coloured particles. Alternatively, transmissive devices may be provided, by omission of the white reflective layer and use of a transparent lower plate, with the light therefore making a single pass through the particles. Transparent electrodes, of e.g. ITO, may be used as required, depending on the electrode arrangements, to allow the light to pass through.

The described embodiments may be used in a number of display applications. The speeds at which the particles move under dielectrophoresis, and the consequent times that must be allowed for such movement, render this display slower than some other types of display devices, and would therefore be too slow for many video applications. However, even this disadvantage is alleviated by virtue of only one pixel needing to be addressed as opposed to three separately coloured sub-pixels.

Furthermore, the dielectrophoretic display devices described above provide saturated full colour display at each pixel, which enables high brightness to be achieved compared to conventional flat panel display devices. One application where this is particularly advantageous, and where the relative slow frame rate of the above described devices is not a significant issue, is the provision of so-called "electronic paper". The terminology "electronic paper" refers to a type of reflective display application where the device is of flat form and displays e.g. an updateable (but not necessarily moving) image on a white background. By providing a saturated full colour display at each pixel, the above described dielectrophoretic display devices may be used to provide a visual quality in an "electronic paper" application far closer to that achieved by ink on paper than is possible by conventional colour displays requiring sub-pixels of different colours.

The invention claimed is:

1. A dielectrophoretic mixture for a display device, comprising:
   a transparent liquid;
   a plurality of first colour transparent dielectrophoretic particles of a first of the subtractive primary colours; and
   a plurality of second colour transparent dielectrophoretic particles of a second of the subtractive primary colours; wherein
   the first colour transparent dielectrophoretic particles have a different dielectrophoretic frequency characteristics in the transparent liquid compared to the second colour transparent dielectrophoretic particles; and
   the first colour transparent dielectrophoretic particles have a different speed in the transparent liquid under dielectrophoretic movement compared to the second colour transparent dielectrophoretic particles.

2. A dielectrophoretic mixture according to claim 1, wherein the first colour transparent dielectrophoretic particles have, compared to the second colour transparent dielectrophoretic particles, a different transition frequency at which dielectrophoretic movement in the transparent liquid changes from movement towards a higher electric field to movement towards a lower electric field or from movement towards a lower electric field to movement towards a higher electric field.

3. A dielectrophoretic mixture according to claim 1, wherein the first colour transparent dielectrophoretic particles have a dielectrophoretic frequency characteristic in which dielectrophoretic movement changes from movement towards a higher electric field to movement towards a lower electric field with increasing frequency; and the second colour transparent dielectrophoretic particles have a dielectrophoretic frequency characteristic in which dielectrophoretic movement changes from movement towards a lower electric field to movement towards a higher electric field with increasing frequency.

4. A dielectrophoretic mixture according to claim 1, further comprising:
   a plurality of third colour transparent dielectrophoretic particles of the third of the subtractive primary colours; wherein
   the third colour transparent dielectrophoretic particles have a different dielectrophoretic frequency characteristic in the transparent liquid compared to both the first and second colour transparent dielectrophoretic particles.

5. A dielectrophoretic mixture according to claim 4, wherein the third colour transparent dielectrophoretic particles have a different speed in the transparent liquid under dielectrophoretic movement compared to both the first and second colour transparent dielectrophoretic particles.

6. A dielectrophoretic mixture according to claim 5, wherein the third colour transparent dielectrophoretic particles have, compared to both the first and second colour transparent dielectrophoretic particles, a different transition frequency.

7. A dielectrophoretic mixture according to claim 6, wherein the differing speeds of the differently coloured particles vary from lowest speed to highest speed, or from highest speed to lowest speed, in accordance with increasing transition frequency of the three particle colours.

8. A dielectrophoretic mixture according to claim 4 when dependent from claim 3, wherein the third colour transparent dielectrophoretic particles have, compared to at least either of the first and second colour transparent dielectrophoretic particles, a different transition frequency.

9. A dielectrophoretic mixture according to claim 1, wherein the difference in speeds between respective colours comprises at least a factor of two difference.

10. A dielectrophoretic mixture according to claim 9, wherein the difference in speeds between respective colours comprises a factor of ten difference.

11. A dielectrophoretic mixture according to claim 1, wherein the different speeds between respective colours is substantially determined by the particles of different colours being of different sizes.

12. A dielectrophoretic mixture according to claim 1, wherein the mixture is encapsulated in a plurality of polymer capsules.

13. A dielectrophoteric display device, comprising:
   opposing plates with a light modulation layer arranged therebetween;
   the light modulation layer comprising a dielectrophoteric mixture, said dielectrophoretic mixture comprising a transparent liquid;
   a plurality of first colour transparent dielectrophoretic particles of a first of the subtractive primary colours; and
   a plurality of second colour transparent dielectrophoretic particles of a second of the subtractive primary colours; wherein
   the first colour transparent dielectrophoretic particles have a different frequency characteristics in the transparent liquid compared to the second colour transparent dielectrophoretic particles; and
   the first colour transparent dielectrophoretic particles have a different speed in the transparent liquid under dielectrophoretic movement compared to the second colour transparent particles; wherein
   at least one of the plates is provided with a plurality of electrodes arranged to provide electric fields to the light modulation layer, the electrodes being arranged so that the light modulation layer is operably divided into a plurality of individually addressable pixels, each pixel comprising an area of the light modulation layer in which at least one higher electric field region and at least one lower electric field region is provided when the electrodes are driven, and the light modulation layer and the electrodes being further arranged such that, when drive voltages comprising predetermined frequencies and durations are provided to drive the electrodes, light passing through the light modulation layer is modulated in colour at each pixel according to the relationships between the dielectrophoretic frequency characteristics and speeds of the different coloured particles compared to the frequencies and durations of the drive voltages.

14. A device according to claim 13, wherein one of the plates is provided with a white reflective layer such that, in use, light that passes through the light modulation layer is reflected back through the light modulation layer thereby providing a reflective display device.

15. A device according to claim 13, wherein the plurality of electrodes comprise, for each pixel, at least two electrodes at which the electric field for the pixel is terminated, and at least one further electrode provided for adjusting the relative locations of the at least one higher electric field region and the at least one lower electric field region.

16. A device according to claim 13, further comprising an active matrix driving array provided on at least one of the plates.

17. A dielectrophoretic display device, comprising:
a transparent liquid, comprising:
a plurality of transparent cyan-coloured particles;
a plurality of transparent magenta-coloured particles; and
a plurality of transparent yellow-coloured particles;
wherein
particles of the same colour have substantially the same dielectrophoretic frequency characteristic as each other and substantially the same dielectrophoretic speed as each other;
the dielectophoretic frequency characteristics of the three colours of particles are each different between the three colours; and
the dielectrophoretic speeds of at least two of the three colours of particles are each different between the three colours.

18. A device according to claim 17, wherein the dielectrophoretic speeds of the three colours of particles are each different.

19. A device according to claim 17, further comprising a white reflective layer.

20. A method of driving a pixel of a dielectrophoretic display device, comprising:
refreshing the pixel by applying a refresh alternating voltage comprising a combination, or plural combinations applied sequentially, of frequency and duration to move substantially all the dielectrophoretic particles of each of the colours to a refresh field region of the pixel, where the refresh field region comprises a predetermined one of a higher electric field region or a lower electric field region; and
driving the pixel by applying a drive alternating voltage comprising a combination, or plural combinations applied sequentially, of frequency and duration to move required proportions of the dielectrophoretic particles of the respective colours to a drive field region of the pixel, where the drive field region comprises the other of the higher electric field region or the lower field region compared to the refresh field region, wherein the colour or colours of the particles between the colours moved by the drive signal is determined by the frequency or frequencies of the drive signal and the proportion of the particles of the determined colour or colours moved by the drive signals is determined by the respective duration of the drive signal for each frequency or frequencies.

21. A method according to claim 20, wherein the refresh field region of the pixel comprises substantially all of the light modulating area of the pixel.

22. A method according to claim 21, wherein moving substantially all the dielectrophoretic particles of each of the subtractive primary colours to the refresh region causes the particles to absorb substantially all the wavelengths of the light thereby providing a black refresh mode for the pixel, and moving particles out of the refresh region according to their colour causes those particles remaining to absorb only certain wavelengths of the light thereby providing a saturated full colour mode, including white, for the pixel.

23. A method according to claim 20, wherein the drive field region of the pixel comprises substantially all of the light modulating area of the pixel.

24. A method according to claim 23, wherein moving substantially all the dielectrophoretic particles of each of the subtractive primary colours to the refresh region causes none of the wavelengths of the light to be absorbed thereby providing a white refresh mode for the pixel, and moving particles out of the refresh region and into the drive region according to their colour causes those particles so moved to absorb certain wavelengths of the light thereby providing a saturated full colour mode, including black, for the pixel.

25. A method according to claim 20, comprising applying a voltage at a frequency that tends to move particles of a single colour or two colours required to be moved and tends to move particles of a single colour or two colours required to remain unmoved, the voltage being applied for a duration long enough to substantially move the particles of the single colour or two colours required to be moved and short enough to leave substantially unmoved the particles of the single colour or two colours required to remain unmoved.

26. A method according to claim 20, wherein applying the refresh or drive voltage comprises applying a longer duration signal of a first frequency for moving particles of a first colour followed by a shorter duration signal of a second frequency for moving particles of a second colour.

27. A method according to claim 20, wherein the display device comprises a dielectrophoretic mixture;
the step of refreshing the pixel by applying a refresh voltage comprises applying a voltage of a single refresh frequency for a duration that is long enough for substantially all the particles of all the colours to move to the refresh field region, the single refresh frequency being a frequency outside a transition frequency band ranging from the lowest of the three individual colour transition frequencies to the highest of the three individual colour transition frequencies;
the different speeds of the differently coloured particles becween the three colours are such that the fastest coloured particles are those of the colour whose transition frequency is furthest from the refresh frequency and the slowest coloured particles are those of the colour whose transition frequency is nearest the refresh frequency; and a required display colour is provided by moving substantially all the particles of only one or only two of the colours from the refresh field region to the drive field region by applying a voltage at an applied frequency beyond the transition frequency furthest away from the refresh frequency of the colour or colours to be moved but not so far away from the refresh frequency to be beyond any further away transition frequencies of any colours not required to be moved, for a duration long enough to allow to move substantially all of the particles of the only one or only two colours required to be moved, but too short to substantially allow to move any pacticles of a colour that is not required to be moved but whose transition frequency lies between the refresh frequency and the applied frequency.

28. A method according to claim 20, wherein the display device comprises a dielectrophoretic mixture; and particles of a given colour are substantially moved in a required direction without substantially moving particles of one or both of the other colours in an undesired direction by applying a voltage for a duration long enough to substantially move the particles of the given colour but not long enough to substantially move the particles of one or both of the other colours.

29. A method according to claim 20, further comprising moving selected proportions of selected colours of particles by applying the drive voltages for durations between durations long enough to move substantially all the particles of a given colour and short enough to substantially prevent any particles of the given colour from moving.

* * * * *